(12) United States Patent
Arriola

(10) Patent No.: US 11,806,849 B1
(45) Date of Patent: Nov. 7, 2023

(54) METHOD FOR ATTACHING A PLUG PULLER TO A PIPE

(71) Applicant: Roberto Arriola, Elkridge, MD (US)

(72) Inventor: Roberto Arriola, Elkridge, MD (US)

( * ) Notice: Subject to any disclaimer, the term of this patent is extended or adjusted under 35 U.S.C. 154(b) by 0 days.

(21) Appl. No.: 18/077,070

(22) Filed: Dec. 7, 2022

(51) Int. Cl.
  *B25B 27/14* (2006.01)
  *F16L 1/06* (2006.01)
  *F16L 1/032* (2006.01)

(52) U.S. Cl.
  CPC .............. *B25B 27/14* (2013.01); *F16L 1/06* (2013.01); *F16L 1/032* (2013.01)

(58) Field of Classification Search
  CPC .............. B25B 27/14; F16L 1/06; F16L 1/032
  See application file for complete search history.

(56) References Cited

U.S. PATENT DOCUMENTS

2020/0378529 A1* 12/2020 Crane ..................... F16L 55/18

* cited by examiner

*Primary Examiner* — Rick K Chang
(74) *Attorney, Agent, or Firm* — GARCIA-ZAMOR INTELLECTUAL PROPERTY LAW, LLC; Ruy Garcia-Zamor

(57) ABSTRACT

Multiple devices, systems, and/or methods for facilitating the placement of pipe through underground passageways or the pulling of pipe through any circuit while reducing the amount of manual force that needs to be used to engage in a plug puller with the pipe's.

16 Claims, 15 Drawing Sheets

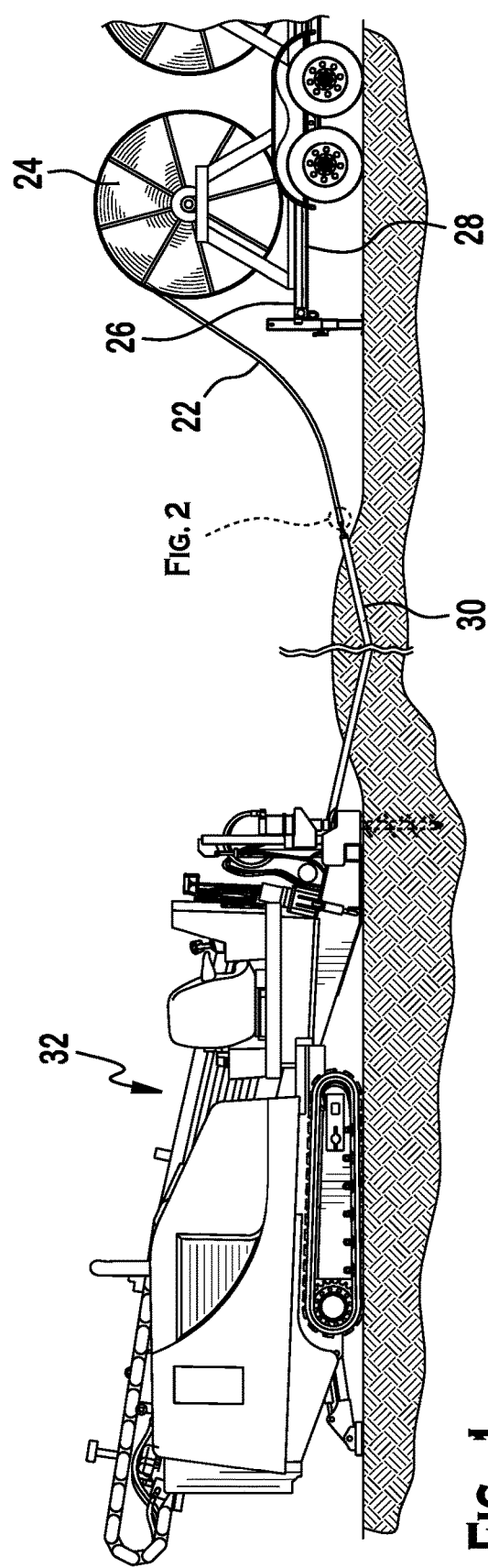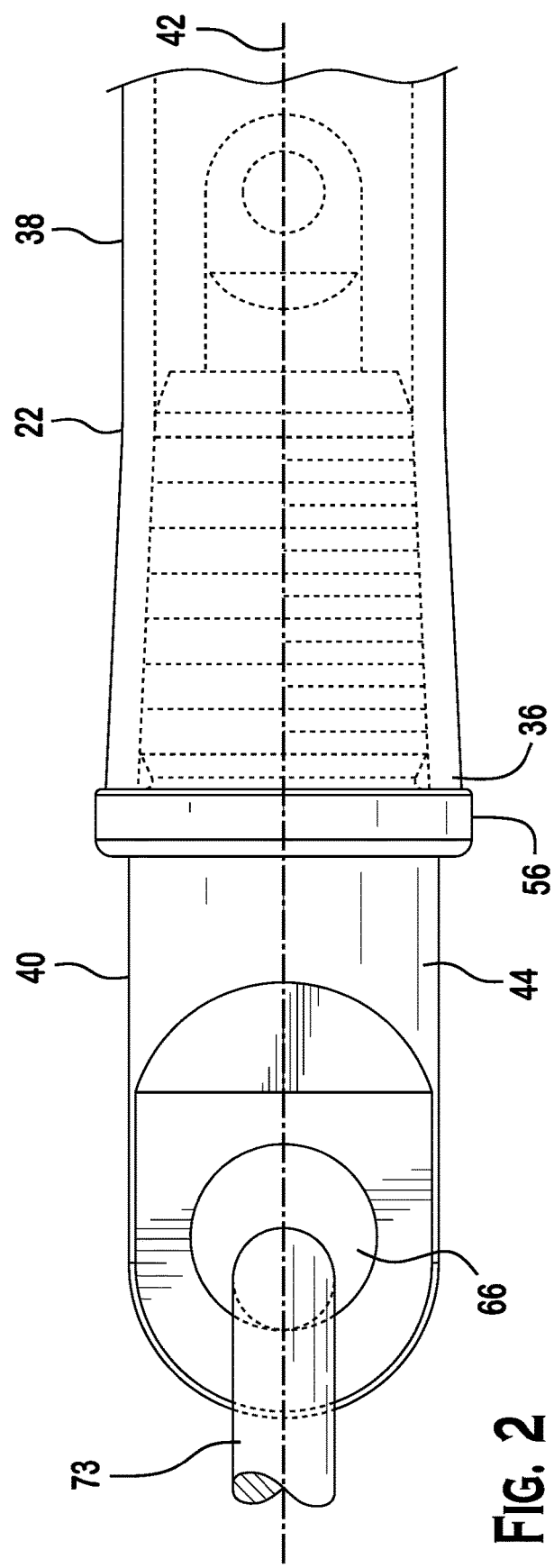

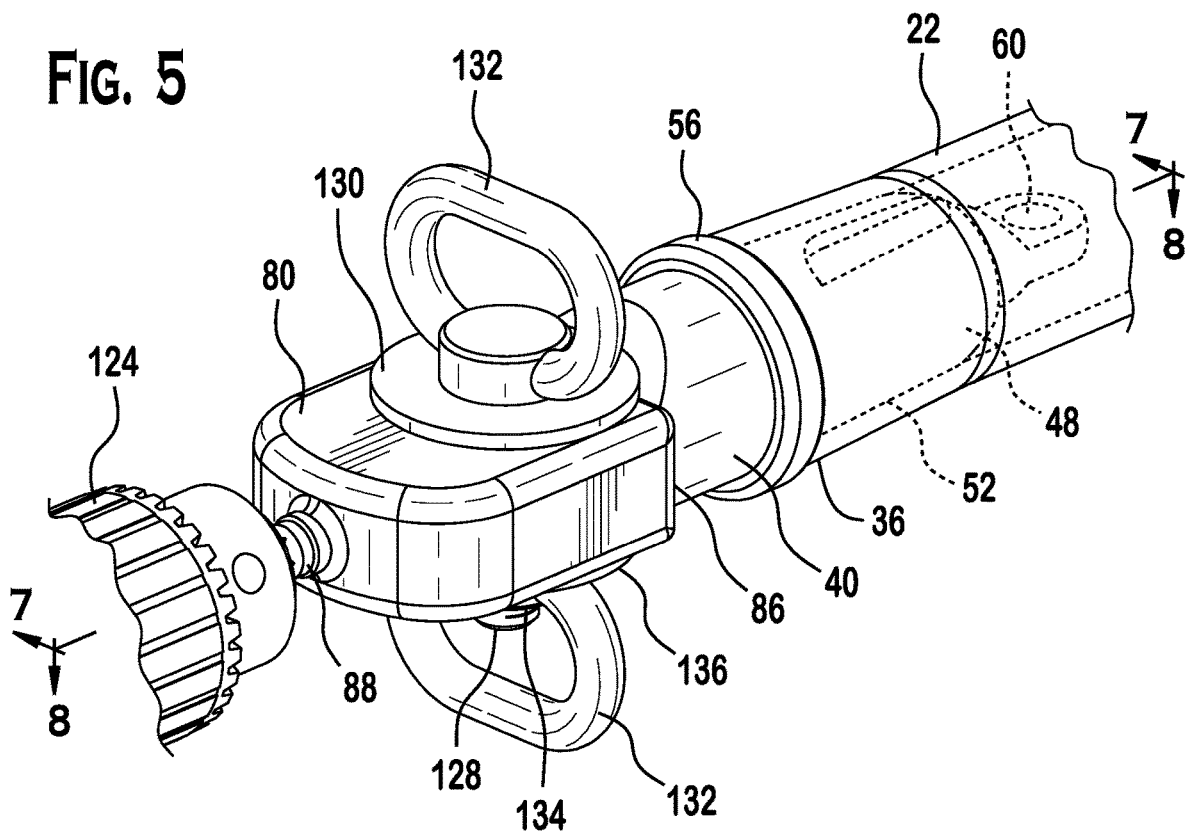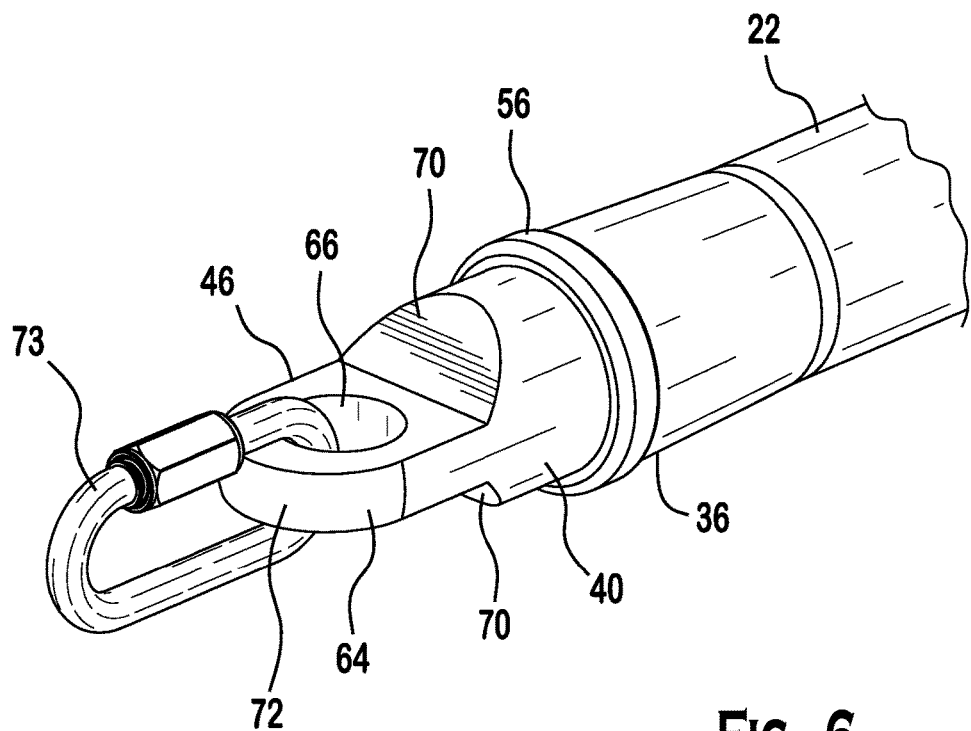

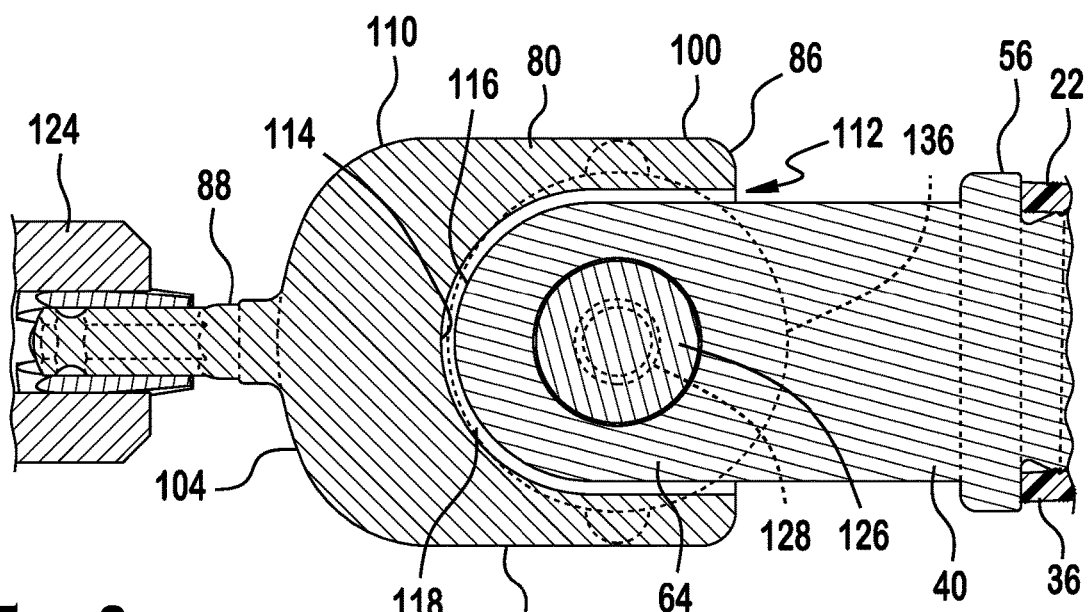
FIG. 8
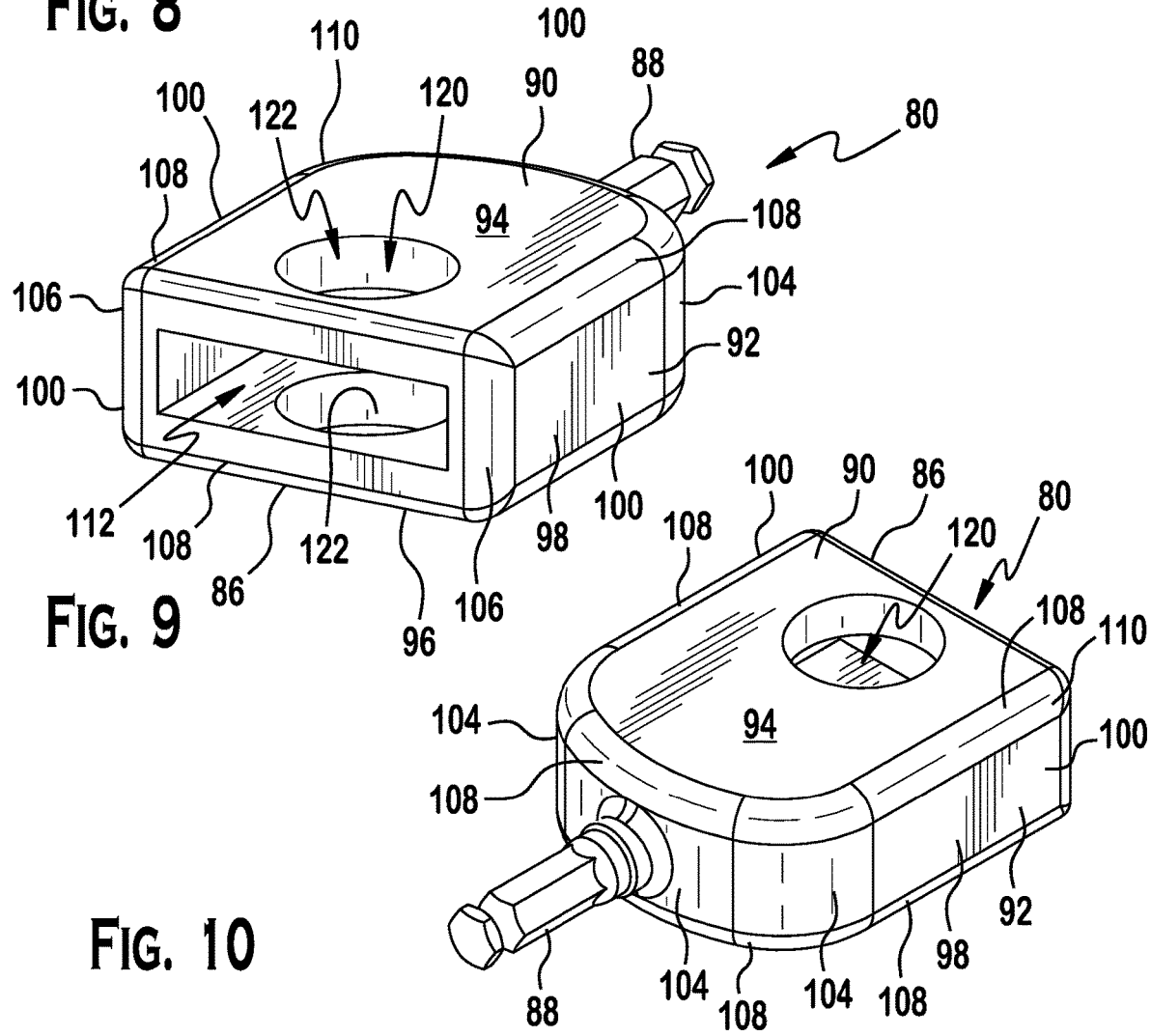
FIG. 9
FIG. 10

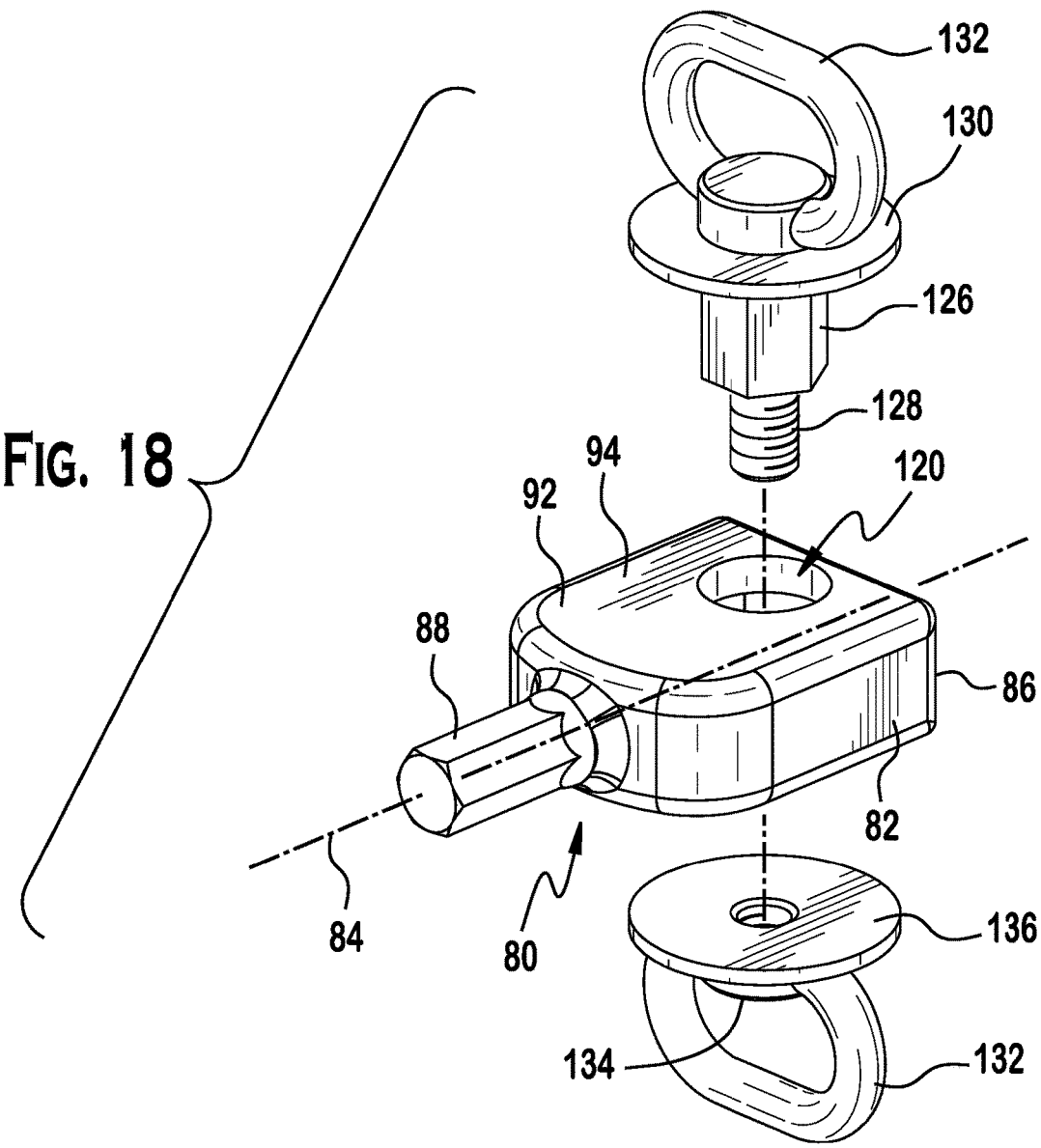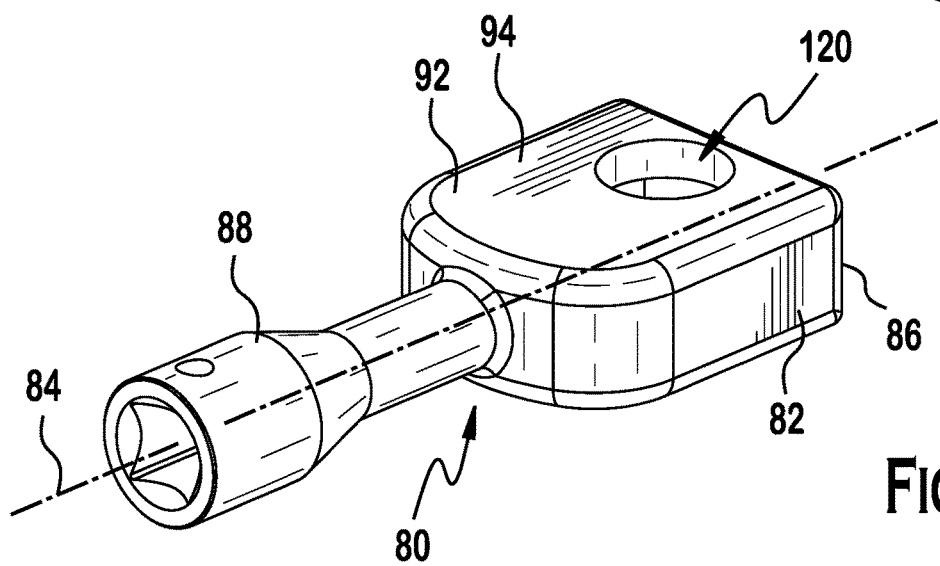

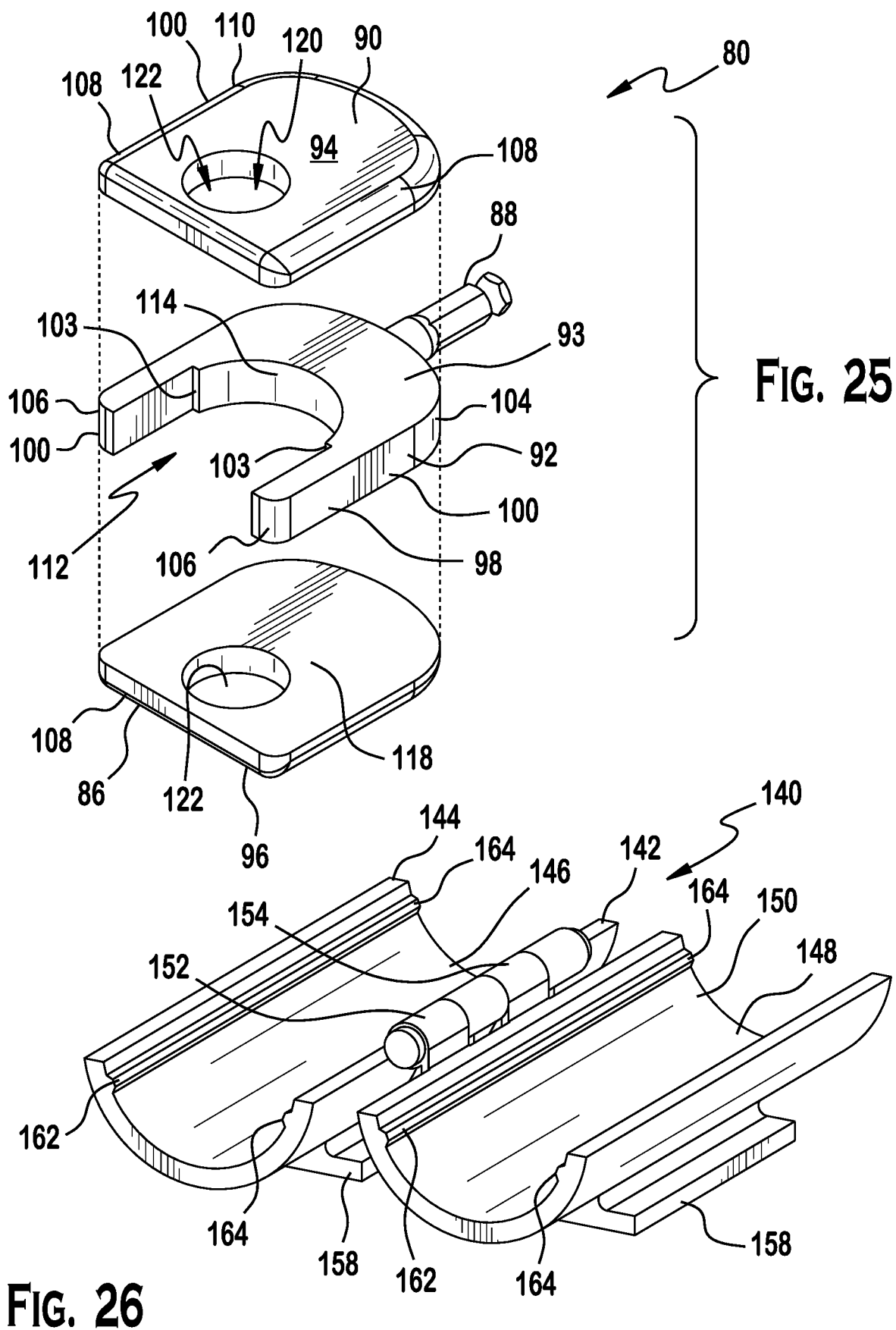

METHOD FOR ATTACHING A PLUG PULLER TO A PIPE

BACKGROUND

The present invention is generally directed to the placement of pipes. More specifically, the present invention is directed to devices, the system, and methods for simplifying and streamlining the positioning of pipes in underground channels or other locations.

The placement of pipe currently requires two men with one securing the position of the pipe and another using a large lever to manually crank a plug puller into an end of the pipe with sufficient force to create a friction-fit that will allow the plug puller to drag a length of pipe through the passageway. This exhausting process is both time-consuming and results in the rapid loss of energy by workers due to the intense physical labor required to manually crank the plug puller through thirty or more complete rotations necessary to secure the plug puller to a pipe.

It may be advantageous to provide a device, system, and/or method that: facilitates the insertion of a plug puller into a pipe; eliminates the need for manual labor to rotate the plug puller during engagement of the plug puller with the pipe; increases the speed with which a plug puller can be engaged to disengage from a pipe; improves the ability to hold the pipe in an immobilized fashion; increases the efficiency of operations that connect the plug puller to a pipe; increases the efficiency of underground pipe installation processes; uses components that can be readily manufactured; and/or includes steps that can be readily explained to trainees.

SUMMARY

Briefly speaking, one embodiment of the present invention is directed to a method for attaching a plug puller to a pipe. The method preferably includes the steps of: providing the pipe which defines a pipe opening at a first pipe axial end thereof and providing a plug puller having a plug puller longitudinal axis. The plug puller may include a plug puller body having a first plug puller axial end and a second plug puller axial end. The second plug puller axial end can have a cylindrical shape with a thread located on an outer surface thereof. The first plug puller axial end can be formed by a plate having a bore therethrough. The bore may be oriented perpendicular to the plug puller longitudinal axis. The method may further include the step of providing a power drive adapter tool. The power drive adapter tool may include a tool body having a tool body longitudinal axis, a first tool body axial end, and a second tool body axial end. The second tool body axial end may be formed by a shroud. The shroud can define a slot with an opening at the second tool body axial end configured to receive the plate of the plug puller therein. The method may further include the steps of: positioning the second plug puller axial end at the pipe opening such that the thread can be brought into engagement with the pipe opening; positioning the shroud over the plate such that the plate is inserted into the slot; securing the first tool body axial end to a power driver so that the plug puller can be rotated and about the plug puller axial axis to force the second plug puller axial end into the pipe with the thread securely engaging the pipe; and driving the plug puller into the pipe using the power driver such that the plug puller does not have to be manually rotated to secure the plug puller to the pipe.

In another aspect, the present invention is directed to a method for attaching a plug puller to a pipe. The method preferably includes the steps of: providing a power drive adapter tool. The power drive adapter tool may be configured to be driven by a power driver (such as a powered commercial drill or powered impact hammer) such that any plug puller secured by the power drive adapter tool can be driven into the pipe using the power driver such that the plug puller does not have to be manually rotated to secure the plug puller to the pipe. It is preferred that any manual force which needs to be applied by a user can be applied only to holding the power driver in a generally stationary position such that all of the turning of the power driver adaptor tool is done by the power driver.

In another aspect, the present invention is directed to a method for attaching a plug puller to a pipe. The method preferably includes the steps of: providing a power drive adapter tool. The power drive adapter tool may be configured to be driven by a power driver (such as a powered commercial drill or powered impact hammer) such that any plug puller secured by the power drive adapter tool can be driven into the pipe using power driver such that the plug puller does not have to be manually rotated to secure the plug puller to the pipe.

In another aspect, the present invention is directed to a method for attaching a plug puller to a pipe. The method preferably includes the steps of: providing a power drive adapter tool. The power drive adapter tool may be configured to be driven by a power driver (such as a powered commercial drill or powered impact hammer) such that any plug puller secured by the power drive adapter tool can be driven into the pipe using power driver such that the plug puller does not have to be manually rotated to secure the plug puller to the pipe. It is preferred that any manual force which needs to be applied by a user is applied only to holding the commercial power driver at two hand points such that the power driver can be generally maintained in a generally stationary position such that all of the turning of the power driver adaptor tool is done by the power driver without a user directly manually rotating the plug puller and without a user using a lever to manually drive rotation of the plug puller.

In another aspect, the present invention is directed to a method for attaching a plug puller to a pipe. The method preferably includes the steps of: providing a power drive adapter tool. The power drive adapter tool may be configured to be driven by a power driver (such as a powered commercial drill or powered impact hammer) such that any plug puller secured by the power drive adapter tool can be driven into the pipe using the power driver such that the plug puller does not have to be manually rotated to secure the plug puller to the pipe while still allowing the plug puller to be inserted into the polymer pipe with a great enough interference fit to allow the plug puller to pull a length of the pipe which is at least one thousand feet through an underground hole without the plug puller detaching from the pipe.

In another aspect, the present invention is directed to a method for attaching a plug puller to a pipe. The method preferably includes the steps of: providing a power drive adapter tool. The power drive adapter tool may be configured to be driven by a power driver (such as a powered commercial drill or powered impact hammer) such that any plug puller secured by the power drive adapter tool can be driven into the pipe using the power driver such that the plug puller does not have to be manually rotated to secure the plug puller to the pipe while still allowing the plug puller to be inserted into the polymer pipe with a great enough interference fit to allow the plug puller to pull a length of the pipe which is at least one thousand five hundred feet through an underground hole without the plug puller detaching from the pipe.

In another aspect, the present invention is directed to a method for attaching a plug puller to a pipe. The method preferably includes the steps of: providing a power drive adapter tool. The power drive adapter tool may be configured to be driven by a power driver (such as a powered commercial drill or powered impact hammer) such that any plug puller secured by the power drive adapter tool can be driven into the pipe using the power driver such that the plug puller does not have to be manually rotated to secure the plug puller to the pipe while still allowing the plug puller to be inserted into the polymer pipe with a great enough interference fit to allow the plug puller to pull a length of the pipe which is at least two thousand feet through an underground hole without the plug puller detaching from the pipe.

In another aspect, the present invention is directed to a method for attaching a plug puller to a pipe. The method preferably includes the steps of: providing a power drive adapter tool. The power drive adapter tool may be configured to be driven by a power driver (such as a powered commercial drill or powered impact hammer) such that any plug puller secured by the power drive adapter tool can be driven into the pipe using the power driver such that the plug puller does not have to be manually rotated to secure the plug puller to the pipe while still allowing the plug puller to be inserted into the polymer pipe with a great enough interference fit to allow the plug puller to pull a length of the pipe which is at least three thousand feet through an underground hole without the plug puller detaching from the pipe.

In another aspect, the present invention is directed to a method for attaching a plug puller to a pipe. The method preferably includes the steps of: providing a power drive adapter tool. The power drive adapter tool may be configured to be driven by a power driver (such as a powered commercial drill or powered impact hammer) such that any plug puller secured by the power drive adapter tool can be driven into the pipe using the power driver such that the plug puller does not have to be manually rotated to secure the plug puller to the pipe while still allowing the plug puller to be inserted into the polymer pipe with a great enough interference fit to allow the plug puller to pull a length of the pipe which is at least four thousand feet through an underground hole without the plug puller detaching from the pipe.

In another aspect, the present invention is directed to a system configured for attaching a plug puller to a pipe which defines a pipe opening at a first pipe axial end thereof. The system may include a power drive adapter tool configured to engage a first end of the plug puller. The power drive adaptor tool can include a tool body having a tool body longitudinal axis, a first tool body axial end, and a second tool body axial end. The second tool body axial end may be formed by a shroud. The shroud can define a slot with an opening at the second tool body axial end configured to receive the first end of the plug puller therein. The shroud may define a passageway therethrough. The power drive adaptor tool may be configured such that when the end of the plug puller is inserted in the slot of the shroud the passageway is configured to be aligned with a bore in the end of the plug puller. A locking pin may be positionable through the passageway of the shroud and configured such that when the end of the plug puller is inserted in the shroud the locking pin secures the shroud to the plug puller.

In another aspect, the present invention is directed to a pipe immobilizer which may include a first clamp section having a first pipe abutment surface. A second clamp section can have a second pipe abutment surface. The second clamp section may be pivotally connected to the first clamp such that when the first and second clamp are rotated together such that the pipe immobilizer is in a first pipe gripping position with the first clamp abutment surface and the second clamp abutment configured to be positioned against an outside of the pipe. The first pipe abutment surface and/or the second pipe abutment surface may have a buildup area thereon configured to facilitate creating a friction fit between the pipe immobilizer and the pipe when the pipe immobilizer is in the first pipe gripping position.

In another aspect, the present invention is directed to a power drive adapter tool configured to engage a first end of a plug puller. The power drive adaptor tool may include a tool body having a tool body longitudinal axis, a first tool body axial end, and a second tool body axial end. The second tool body axial end may be formed by a shroud. The shroud can define a slot with an opening at the second tool body axial end configured to receive the first end of the plug puller therein. The shroud preferably defines a passageway therethrough. The power drive adaptor tool can be configured such that when the end of the plug puller is inserted in the slot of the shroud, the passageway is configured to be aligned with a bore in the end of the plug puller. A locking pin may be positionable through the passageway of the shroud and configured such that when the end of the plug puller is inserted in the shroud the locking pin secures the shroud to the plug puller.

BRIEF DESCRIPTION OF THE DRAWINGS

The foregoing summary, as well as the following detailed description of the preferred embodiments of the present invention will be better understood when read in conjunction with the appended drawings. For the purposes of illustrating the invention, there are shown in the drawings embodiments which are presently preferred. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. It is understood, however, that the invention is not limited to the precise arrangements and instrumentalities shown. In the drawings:

FIG. 1 is a schematic view of equipment used for the placement of piping 22 underground. Spools 24 of pipe 22 are preferably located on a bed 26 of a tractor-trailer 28. Commercial boarding equipment 32 is used to form an underground passageway 30. After the passageway 30 is complete the pipe 22 is drawn through the passageway 30. The passageway 30 can be of any length including more than 3000 feet without departing from the scope of the present invention.

FIG. 2 is a top plan, partially broken away view of a plug puller 40 inserted in an opening of a pipe 22. A carabiner is engaged with an end of the plug puller 40 that protrudes from the pipe 22. The carabiner can be attached to a cable which is used to pull the pipe 22 through the underground passageway 30. Alternatively, a cable can attached directly to the plug puller for purposes of pulling the pipe 22 through the passageway 30.

FIG. 5 is a broken away perspective view illustrating engagement between the plug puller 40 and the pipe 22.

FIG. 6 is a perspective view of the plug puller 40 fully engaged with the pipe. The power driver adapter 280 is disengaged from the plug puller 40 and the carabiner is engaged with the plug puller 40 to facilitate pulling of the pipe 22.

FIG. 8 is a cross-sectional view of the power drive adapter 124, the power drive adapter 280, the plug puller 40 and a portion of the pipe 22 of FIG. 5 as taken along the lines 8-8 of FIG. 5. The collar 56 prevents further insertion of the plug puller 40 into the pipe once the plug puller 40 is fully inserted into the pipe 22. A plate 64 which forms another end of the plug puller 40 is secured within the power drive adapter tool 80. Specifically, the plate 64 is secured within slot 112 of the power drive adapter tool. The plate 64 is secured within the power drive adapter tool 80 via unlocking pin 126.

FIG. 9 is a perspective view of the power drive adapter 80 of the present invention illustrating a slot 112 that is formed by the power drive adapter 80 to receive a portion of the plug puller 40 therein. The power drive adapter 80 is preferably formed by first and second major walls 94, 96. The first and second major walls 94, 96 are preferably connected by connecting wall 98 which may be formed by lateral sections 100 and arcuate section 104. A passageway 120 is formed through the shroud 90.

FIG. 10 is a second perspective view of the power drive adapter 80 of FIG. 9 illustrating the arcuate section 104 having a general C-shaped configuration. It is preferred that the edges of the shroud are rounded and that the second tool body axial end 88 forms an attachment for securing the power drive adapter tool 82 the power driver 124.

FIG. 14 illustrates the engagement of the first and second pipe abutment surfaces 146, 150 with the outer surface of the pipe 22. Additionally, FIG. 14 illustrates the preferable radially inwardly extending deformations that result from compression in localized areas of the exterior of the polymer pipe by the first and second pipe abutment surfaces 146, 150.

FIG. 18 is an exploded perspective view of another preferred embodiment of the power drive adaptor tool 80 according to the present invention. The locking pin 126 is shown having a hexagonal cross-section.

FIG. 19 is a perspective view of yet another preferred embodiment of the power drive adaptor tool 80 of the present invention illustrating the second tool body axial end 88 having a circular cross section with a recessed notch (preferably of square cross section) for receiving the commercial impact gun therein. The commercial impact gun can be air powered, electric powered, or use any other power source.

FIG. 25 is an exploded view illustrating yet another preferred embodiment of the power drive adapter tool 80 according to the present invention in which the tool body 82 is formed in part by three plate like pieces: first major wall 94, medial plate 93, and second major wall 96. It is preferred that the medial plate 93 is sandwiched between the first and second major walls 94, 96. The medial plate preferably, but not necessarily has a profile such that there is no gap between the inner wall of the slot 112 and the plate 64 of the plug puller body 44. This figure clearly shows how the three plates can be configured prior to securing them together using any suitable means, such as welding, adhesive, or the like.

FIG. 26 is an alternative embodiment of the pipe immobilizer 142 according to the present invention.

DETAILED DESCRIPTION OF THE PREFERRED EMBODIMENT

Figure 3:
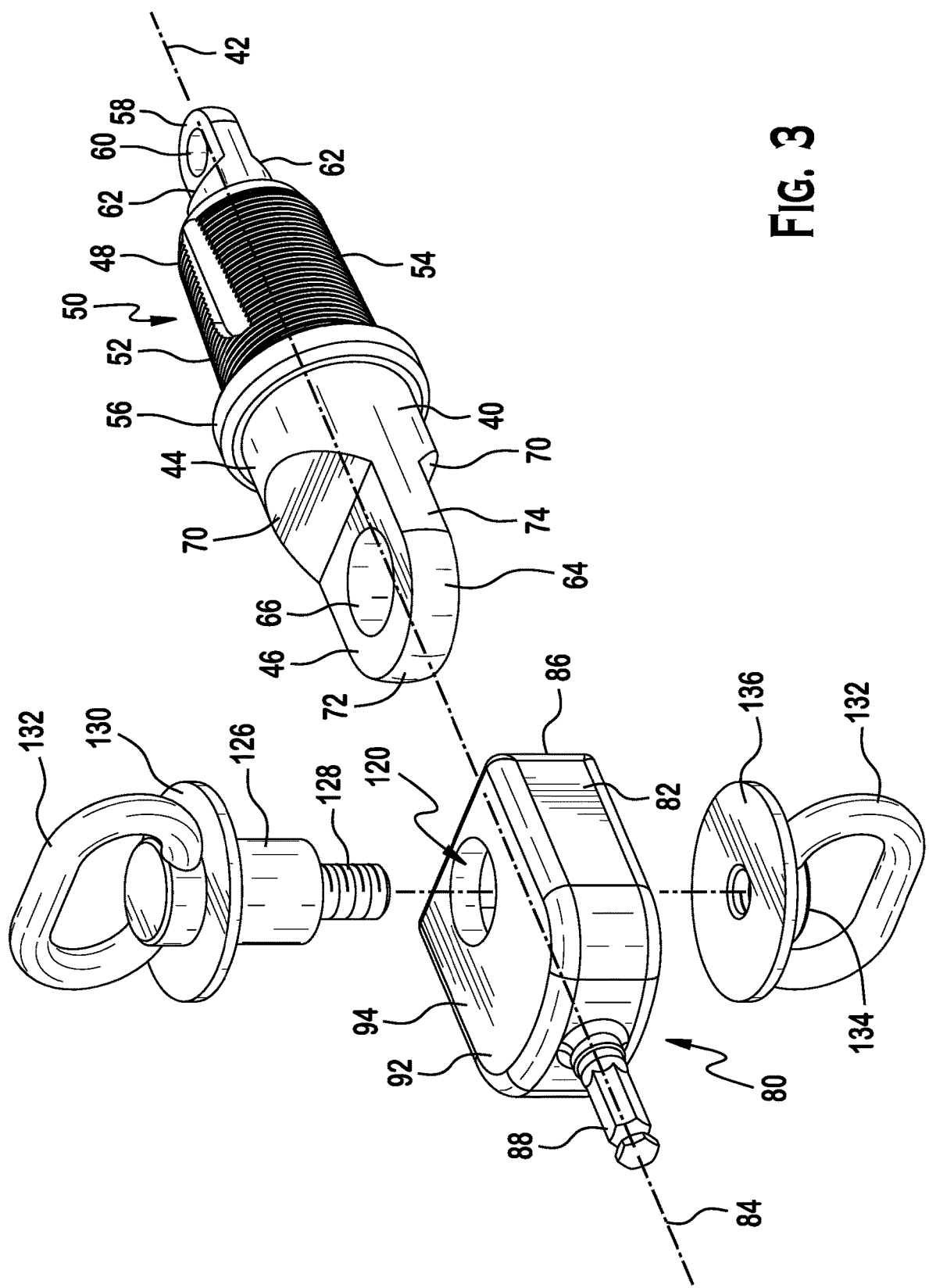
FIG. 3 is an exploded view of the plug puller 40 aligned with a power drive adapter tool 80. The plate 64 of the plug puller is aligned with the slot 112 of the shroud 90 of the power driver adapter tool 80. Once the plug puller 40 is inserted inside the slot 112 of the shroud 90, locking pin 126 is used to secure the two components together. While the locking pin is shown in FIG. 3 as having a circular cross-section, those or ordinary skill in the art will appreciate from this disclosure that the locking pin can have a hexagonal cross section or any other cross-sectional shape without departing from the scope of the present invention. The power drive adapter tool 80 is used to rotate the plug puller 40 during engagement of the plug puller with a pipe opening 34 or during disengagement of the plug puller 40 with a pipe opening 34.

Certain terminology is used in the following description for convenience only and is not limiting. The words "right," "left," "up," and "down" designate the directions as they would be understood by a person facing in the viewing direction unless specified otherwise. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "outer" and "inner" refer to directions away from and toward, respectively, the geometric center of the specified element, or, if no part is specified, the geometric center of the power driver adaptor tool. The terms "downward" and "upward" refers to directions above and below the center of the power driver adaptor tool, respectively, unless specified otherwise. The terms "forward" and "front" refer to a direction in front of the power driver adaptor tool and the term "rear" refers to a direction behind the power driver adaptor tool or an otherwise specified component. The terms "axial" and "radial" refer to directions towards and away from the center of the power driver adaptor tool or specified component respectively. The term "generally aligned" refers to objects which functionally form a single surface such that for low precision mechanical applications they can be treated as uniform. The terms "touching," "abutting," "against," and "contacting" when used in connection with two surfaces is defined as meaning "being positioned anywhere between actual touching of two surfaces to being in facing orientation and within 1 inch (or 2.54 centimeters) apart." Those of ordinary skill in the art will appreciate from this disclosure that the term "generally parallel," as used in the specification and claims, is defined as meaning "within twenty degrees of true parallel." Those of ordinary skill in the art will appreciate from this disclosure that when a range is provided such as (for example) an angle/distance/number/ weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty)(20°) degrees, provides specific literal support for any angle greater than twenty)(20°) degrees, such as twenty-three) (23°) degrees, thirty)(30°) degrees, thirty-three-point five) (33.5°) degrees, forty-five) (45°) degrees, fifty-two)(52°) degrees, or the like and thus provides support for claiming a preferred embodiment with the element moving along the arcuate path thirty-three-point five)(33.5°) degrees. The language "at least one of 'A', 'B', and 'C'," as used in the claims and in corresponding portions of the specification, means "any group having at least one 'A'; or any group having at least one B'; or any group having at least one 'C'; —and does require that a group have at least one of each of 'A', 'B', and 'C'." More specifically, the language 'at least two/three of the following list' (the list itemizing items '1', '2', '3', '4', etc.), as used in the claims, means at least two/three total items selected from the list and does not mean two/three of each item in the list. The term "transverse," as used in the specification, means "situated or extending across something, such as along a side of an object." The term "interior", as used in the claims and corresponding portions of the specification means the area proximate to the center of the invention. The term "exterior" similarly defines the area not in proximity to the center of the invention. Additionally, the words "a" and "one" are defined as including one or more of the referenced items unless specifically stated otherwise. The terminology includes the words specifically mentioned above, derivatives thereof, and words of similar import.

Referring to FIGS. 1-17, wherein like numerals indicate like elements throughout, there are shown preferred embodiments of a system 20 configured to engage a pipe puller with a pipe. A preferred implementation of the preferred method of the present invention will be described below (alone or in combination with various embodiments of the system 10 and/or components thereof). The steps of the method of the present invention can be performed in any order, omitted, or combined without departing from the scope of the present invention. As such, optional or required steps described in conjunction with one implementation of the method can also be used with another implementation or omitted altogether. Additionally, unless otherwise stated, similar structure or functions described in conjunction with the below method preferably, but not necessarily, operate in a generally similar manner to that described elsewhere in this application.

Referring to FIG. 1, equipment used to place commercial pipe 22 underground is shown. Rolls 24 of pipe 22 are shown positioned on a bed 26 of a tractor-trailer 28. The pipe 22 is preferably commercial grade polymer pipe, such as polyvinyl chloride (PVC), that is pulled through an underground passageway 30 which is formed by commercial boring equipment 32. It is preferred that the pipe 22 is one and a half inch pipe. However, those of ordinary skill in the art will appreciate from this disclosure that the pipe can be one and a quarter inch pipe, two inch pipe, or any other size diameter pipe without departing from the scope of the present invention. It is also preferred that the pipe 22 is schedule 80 gauge pipe. Those of ordinary skill in the art will appreciate from this disclosure that any suitable material, size and thickness pipe can be used without departing from the scope of the present invention. Those of ordinary skill in the art will appreciate that the length of the underground passageway 30, and thus, the length of pipe to be pulled is preferably more than five hundred (500) feet. It is more preferable that the length of pipe 22 to be pulled is more than one thousand (1000) feet. It is further preferable that the length pipe to be pulled is more than one thousand five hundred (1500) feet. It is further preferred that the length of pipe 22 to be pulled exceeds two thousand (2000) feet. Furthermore, it is more preferred that the length of pipe to be pulled exceeds three thousand (3000) feet. Those of ordinary skill in the art will appreciate from this disclosure that the passageway 33 which the pipe 22 is to be pulled is preferably, but not necessarily, no more than 10% greater in cross-sectional diameter. In the present invention, it is preferred to use a plug puller 40 that may be engaged with the pipe 22 in such a way as to create a tremendous frictional fit therebetween such that by pulling the plug puller the entire length of the piping can be pulled through the underground passageway 30.

The circumferential force generated by the interference fit between the plug puller 40 and the pipe 22 is preferably, but not necessarily, enough to prevent separation when an axial force of three thousand (3000) pounds is exerted on the plug puller 40 while pulling the pipe 22 through the underground passageway 30. It is more preferable, that the circumferential force generated by the interference fit between the plug puller 40 and the pipe 22 is preferably, but not necessarily, enough to prevent separation when an axial force of ten thousand (10,000) pounds is exerted on the plug puller 40 while pulling the pipe 22 through the underground passageway 30. It is more preferable still, that the circumferential force generated by the interference fit between the plug puller 40 and the pipe 22 is preferably, but not necessarily, enough to prevent separation when an axial force of twelve thousand (12,000) pounds is exerted on the plug puller 40 while pulling the pipe 22 through the underground passageway 30. Those of ordinary skill in the art will appreciate from this disclosure that the amount of circumferential force created by the interference fit between the plug puller 40 and the pipe 22 can be varied (between one twentieth of a pound and 100 or more pounds) or omitted without departing from the scope of the present invention. It is preferred but not necessary that the system of the present invention can be used with commercial directional boring machine which may exert a torque of up to 100,000 pound feet or more.

Figure 4:
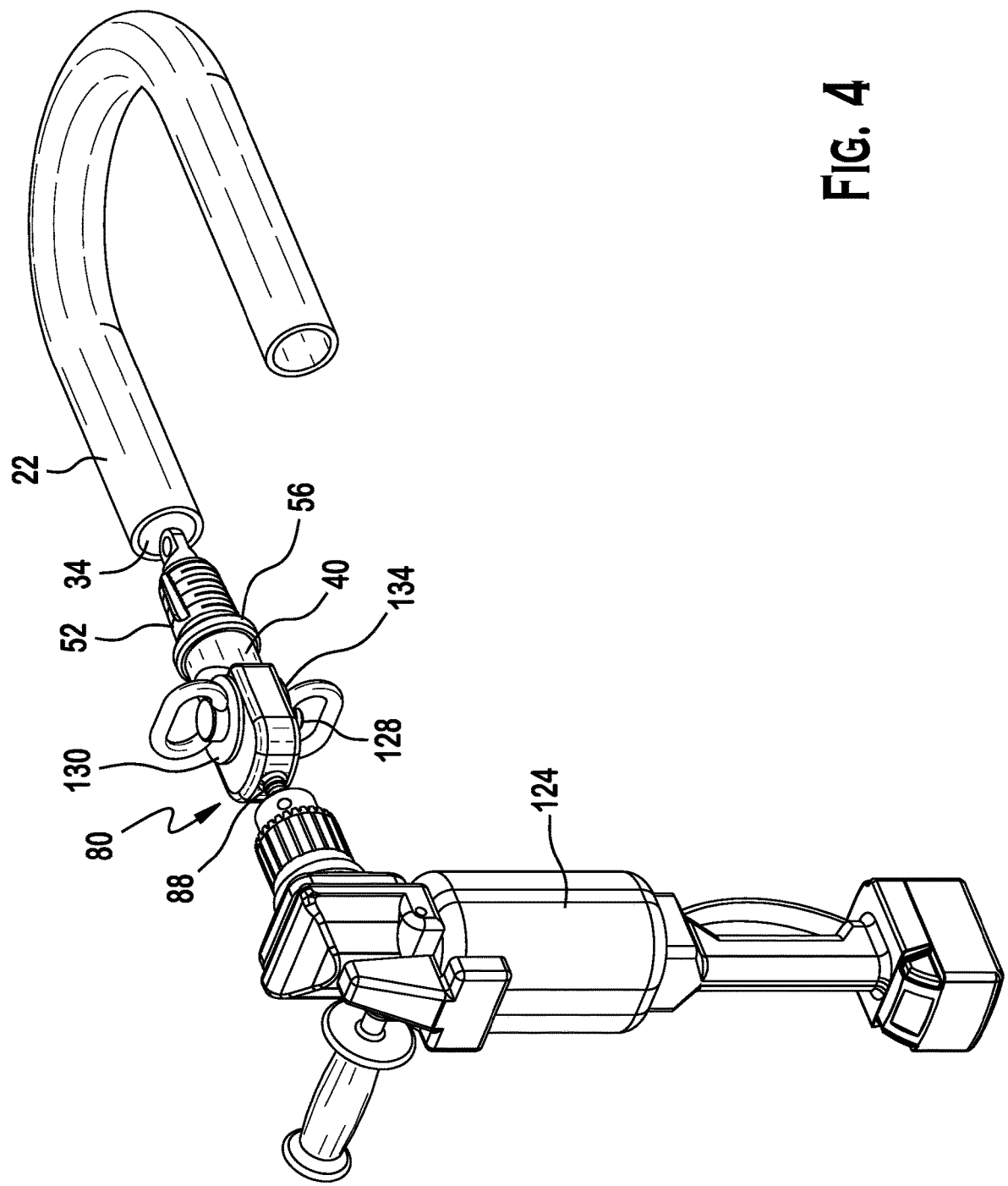
FIG. 4 is a perspective view of the power drive adapter tool 80 engaged with a power driver 124 which is being used to align the plug puller 40 with the opening 34 of the pipe 22.
Figure 11:
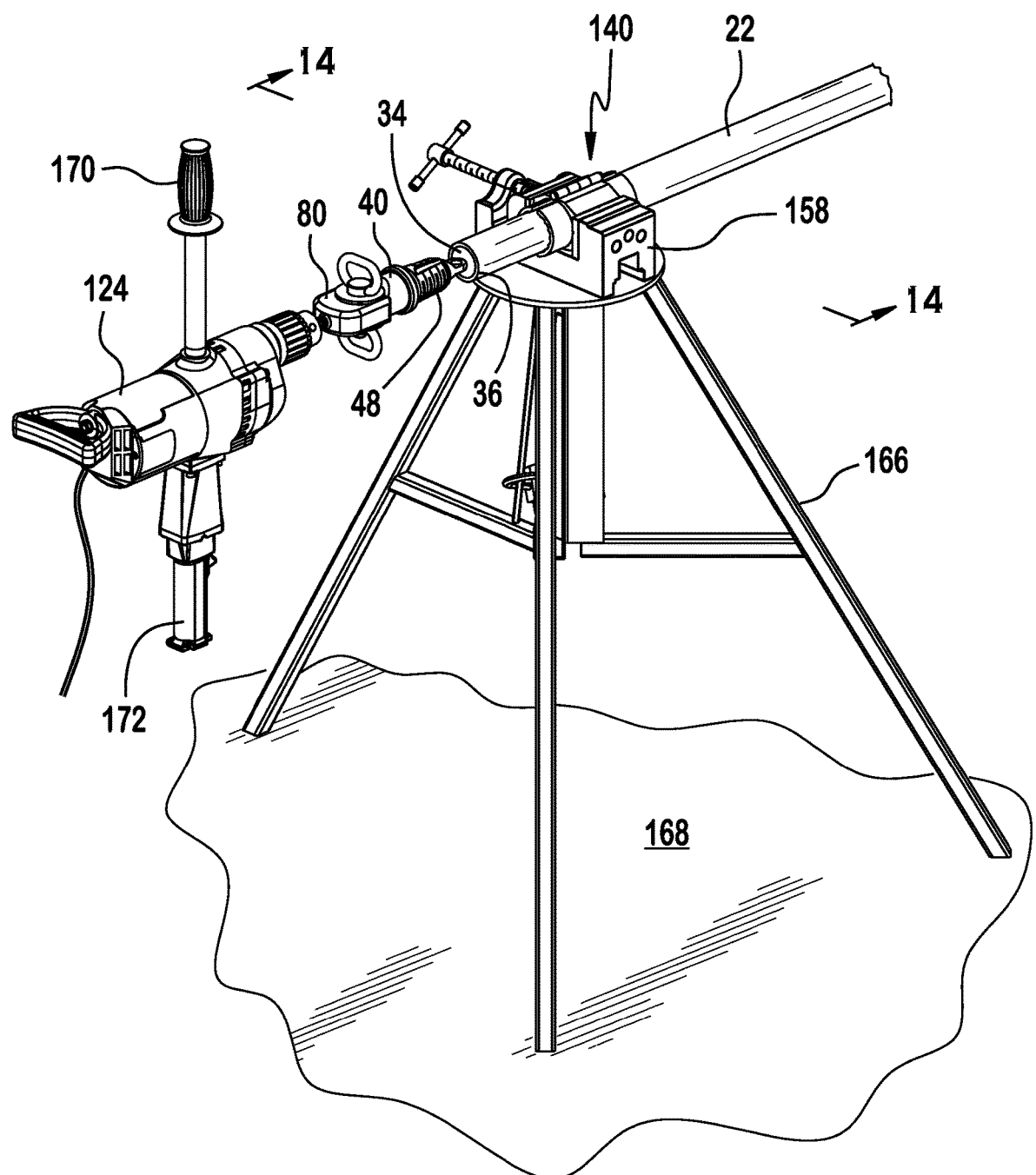
FIG. 11 is a perspective view showing a pipe 22 immobilized in a pipe immobilizer 142 that is secured within a vice on a tripod. A plug puller 40 is secured to the power drive adapter tool 80 which engaged with a power driver 124. The plug puller 40 is shown aligned with an opening 34 of the pipe 22 so that the plug puller 40 can be brought into abutting engagement with the pipe 22 and the power driver 124 activated to use mechanical power to drive the engagement between the plug puller 40 and the pipe 22. The pipe immobilizer preferably makes it possible to use a commercial impact hammer to drive the power drive adaptor tool 80 as it prevents the pipe from twisting in response to force from the commercial impact gun.
Figure 15:
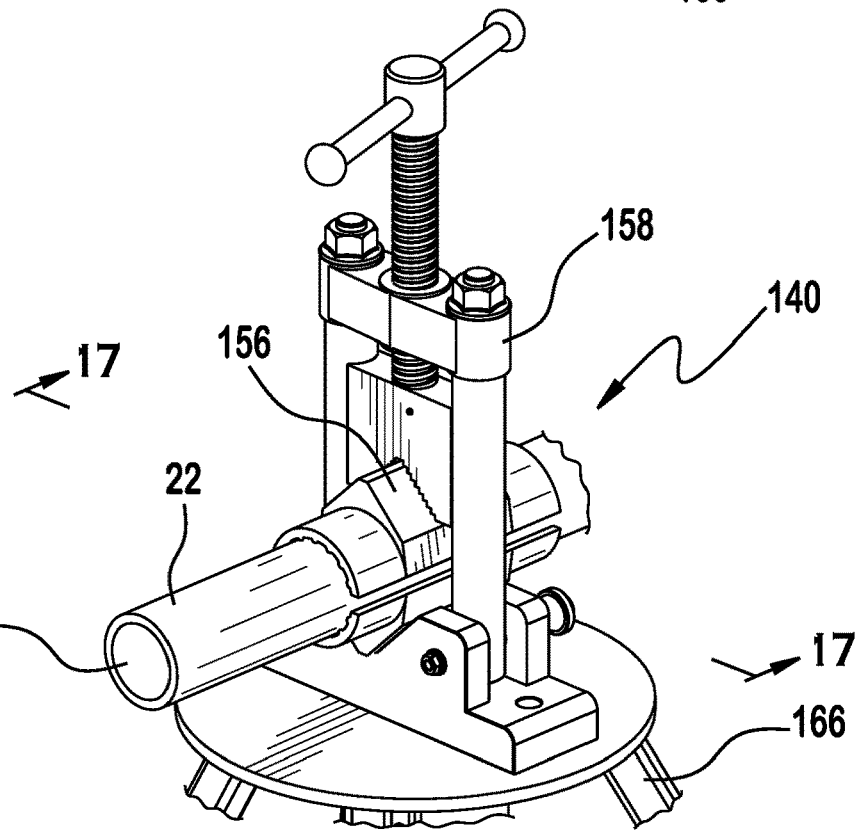
FIG. 15 is a perspective view of a pipe 22 secured in an alternative embodiment of a pipe immobilizer 142 in a different style of vice from that shown in FIG. 11.

Referring to FIG. 2, a method of attaching the plug puller 40 to the pipe 22 preferably includes the step of providing the pipe 22 which defines a pipe opening 34 at a first pipe axial end 36. As best shown in FIGS. 4, 11, and 15, the pipe preferably defines a pipe opening 34. Referring again to FIG. 2, while it is preferred that the outer surface 38 is generally cylindrical, those of ordinary skill in the art will appreciate from this disclosure that the cross-sectional shape of the outer surface 38 of the pipe 22 can have any shape without departing from the scope of the present invention.

The method of the present invention preferably, but not necessarily, includes providing the plug puller 40 which may have a plug puller longitudinal axis 42. As best shown in FIGS. 2 and 3, the plug puller 40 preferably includes a plug puller body 44. The plug puller body 44 preferably has a first plug puller axial end 46 and a second plug puller axial end 48.

Figure 7:
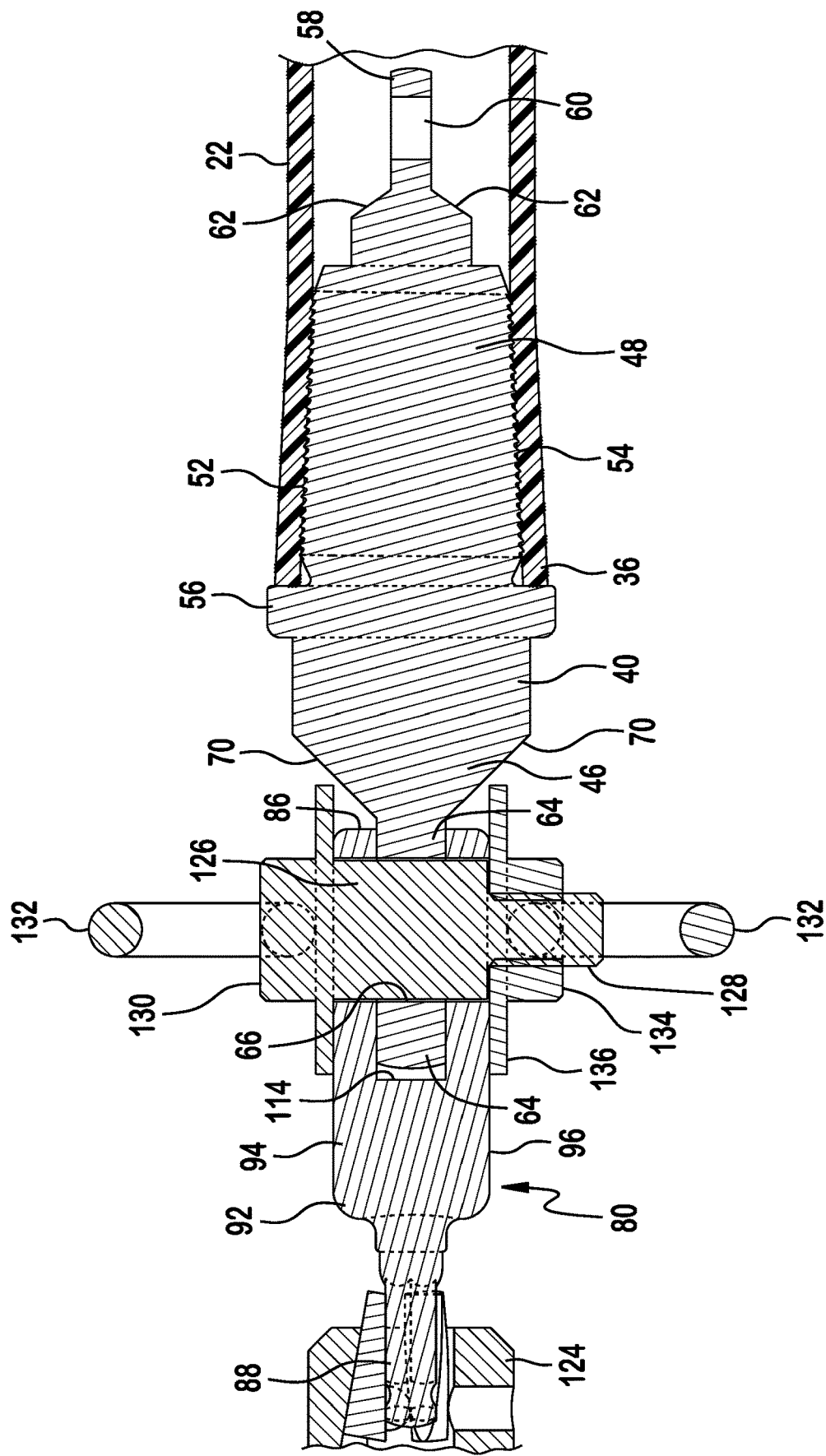
FIG. 7 is a cross-sectional view of the power driver 124, the power drive adapter tool 80, and the pipe 22 of FIG. 5 as taken along the lines 7-7 of FIG. 5. The power driver 124 has already fully engaged the plug puller 40 with the pipe 22 which results in the portion of the pipe proximate to the pipe opening 34 being forced radially outwardly as the thread 52 of the plug puller 40 engages an inner surface of the pipe 22. This outward deformation of an end of the pipe 22 (e.g., the generally conical cross-sectional shape) is due to the increased diameter of the plug puller 40 as one travels from a far right end of the plug puller toward the center of the plug puller. A collar 56 of the plug puller is shown in direct abutment with an end of the pipe 22. The collar 56 prevents further insertion of the plug puller 40 into the pipe once the plug puller 40 is fully inserted into the pipe 22. A plate 64 which forms another end of the plug puller 40 is secured within the power drive adapter tool 80. Specifically, the plate 64 is secured within slot 112 of the power drive adapter tool. The plate 64 is secured within the power drive adapter tool 80 via unlocking pin 126.

The second plug puller axial end 48 preferably has a generally cylindrical shape 50 with the thread 52 located on the outer surface 54 thereof. The plug puller body 44 preferably includes a collar 56 which may be used to determine when the plug puller 40 is fully inserted into the opening 34 of the pipe 22. Referring to FIG. 7, the collar 56 of the plug puller 40 is shown in abutment with the first pipe axial end 36. It is preferred, but not necessary, that when the plug puller 40 is engaged with the pipe 22 that the plug puller 40 is driven in a rotary fashion until the plug puller 40 is inserted into the pipe opening 34 sufficiently for the collar 56 of the plug puller to abut the first pipe axial end 36. Those of ordinary skill in the art will appreciate from this disclosure that an auxiliary plate 58 may be positioned along the plug puller longitudinal axis 42 at the second plug puller axial end 48 without departing from the scope of the present invention. The auxiliary plate 58 may, but does not necessarily, include an auxiliary bore 60 therein.

It is preferred, but not necessary, that the plug puller 40 include a beveled section 62 on the second plug puller axial end to facilitate insertion and alignment with the pipe opening 34.

The first plug puller axial end 46 is preferably, but not necessarily, formed by a plate 64 having a bore 66 therethrough. The bore 66 is preferably, but not necessarily, oriented perpendicular to the plug puller longitudinal axis 42. Referring specifically to FIG. 3, it is preferred that a smooth cylindrical section 68 is formed by the outer surface of the plug puller 40 on the left side of the collar 56. It is also preferred, but not necessary, that angled transitions 70 extend between the smooth cylindrical section 68 and the plate 64 that forms the first plug puller axial end 46. The plate 64 preferably has a generally C-shaped outer perimeter 72. The plate 64 also includes lateral sides 74 that are preferably linear when viewed in a direction parallel to the pipe longitudinal axis 42 and which connect the smooth cylindrical section 68 to the C-shaped outer perimeter section 72 of the first plug puller axial end 46.

Referring to FIGS. 3-5, a method of the present invention preferably includes the step of providing a power drive adapter tool 80. The power drive adapter tool 80 is preferably formed of an extremely strong, rigid, sturdy material such as steel. However, those of ordinary skill in the art will appreciate from this disclosure that the power drive adapter tool 80 may be formed of any suitable material without departing from the scope of the present invention. For example, the power drive adapter tool 80 may be formed of stainless steel, alloy, iron, or any other suitable material without departing from the scope of the present invention.

The power drive adapter tool 80 preferably includes a tool body 82 which may have a tool body longitudinal axis 84. The tool body 82 preferably has a first tool body axial end 86 and a second tool body axial end 88. Referring specifically to FIG. 3, the second tool body axial end 88 is preferably, but not necessarily, formed by a shroud 90. The second tool body axial end 88 that is illustrated is a half inch hexagonal rod with a groove for locking the power drive adapter tool 80 to the power driver 124. Those of ordinary skill in the art will appreciate from this disclosure that the groove can be omitted altogether and that the cross-sectional size of the second tool body axial end 88 can be three quarters of an inch, or any other size, without departing from the scope of the present invention. Similarly, the second tool body axial end 88 can be of circular cross section with a recessed notch (preferably of square cross section) for receiving the commercial impact gun therein. The commercial impact gun can be air powered, electric powered, or use any other power source.

Referring to FIGS. 9 and 10, the shroud 90 preferably includes a shroud enclosure body 92. The shroud enclosure body 92 preferably includes first and second major walls 94, 96, respectively. The first and second major walls 94, 96 are preferably parallel to each other and spaced apart. The first and second major walls 94, 96 are preferably connected by connecting wall 98. The connecting wall 98 may include multiple sections, such as lateral sections 100, 102 and arcuate section 104. Those of ordinary skill in the art will appreciate from the present disclosure that the structural configuration and design of the shroud enclosure body 92 can vary without departing from the scope of the present invention. Accordingly, those of ordinary skill in the art will appreciate that the shroud enclosure body 92 can have the volumetric shape of a globe with a slot therein, or have the volumetric shape of a cube with a slot therein, or have the volumetric shape of a pyramid with a slot therein, or any other volumetric shape (such as, for example only, a cone, truncated cone, or the like) without departing from the scope of the present invention.

The shroud enclosure body 92 may be formed by multiple pieces that are welded, or otherwise joined, together. For example, the shroud enclosure body 92 may be formed by: the first major wall 94, the second major wall 96, two lateral sections 102, and an arcuate section 104 which may be formed by multiple (such as two, three, or more) sections. These components can be secured together to form a single shroud enclosure body 92. However, those of ordinary skill in the art will appreciate that the shroud enclosure body 92 may be formed as a unitary, one piece, continuous component via casting, digital printing, grinding, or the like without departing from the scope of the present invention.

It is preferred that the shroud enclosure body 92 include vertically aligned rounded edges 106 as best shown in FIG. 9. It is also preferred, but not necessary that the shroud enclosure body include rounded edges 108 along the perimeter 110 of the first major wall 94 and the second major wall 96. Those of ordinary skill in the art will appreciate from this disclosure that all rounded edges 106, 108 can be omitted without departing from the scope of the present invention.

The shroud 90 preferably defines a slot 112 therein. Referring specifically to FIG. 9, the opening to the slot 112 may have a generally rectilinear shape. The slot 112 in the second tool body axial end 96 is preferably configured to receive the plate 64 of the plug puller 40 therein. It is preferred that the inner vertical wall 114 of the tool body has a complementary shape to the perimeter of the plate as best shown in FIG. 8. It is preferred that the abutment section 116 of the plate 64 is in contact with the inner vertical wall 114 when the plate 64 is secured inside of the shroud 90. It is further preferred that any volumetric gap 118 in the slot that remains after the plate 64 is fully engaged with the shroud 90 is less than 30% of the volume of the slot 112. It is further preferred that any volumetric gap 118 in the slot 90 that remains after the plate 64 is fully engaged with the shroud 90 is less than 20% of the volume of the slot 112. It is more preferred still that any volumetric gap 118 in the slot 90 the remains after the plate 64 is fully engaged with the slot 112 is less than 10% of the volume of the slot 112. It is yet more preferred that any volumetric gap 118 in the slot 112 that remains after the plate 64 is fully engaged with the slot 112 is less than 5% of the volume of the slot 112. It is yet more preferred still that any volumetric gap 118 and the slot 112 that remains after the plate 64 is fully engaged within the slot 112 is less than 3% of the volume of the slot 112. Those of ordinary skill in the art will appreciate from this disclosure that the volumetric gap 118 can be varied or omitted entirely without departing from the scope of the present invention.

Referring to FIGS. 3, 9, and 10, the shroud 90 preferably has a passageway 120 therethrough. It is preferable, but not necessary, that the passageway 120 is formed by aligned circular-shaped holes 122 in the first and second major walls 94, 96 of tool body 82. Those of ordinary skill in the art will appreciate that the holes 122 may have a non-circular shape. For example, the holes 122 may have an octagonal, square, triangular, or other shape without departing from the scope of the present invention. It is preferred, but not necessary, that the power drive adapter tool 80 is configured such that when the plate 64 of the plug puller 40 is inserted in the slot 112 of the shroud 90 that the bore 66 of the plate 64 is aligned with the passageway 120.

The method of the present invention preferably includes the step of positioning the second plug puller axial end 48 at the pipe opening 34 such that the thread 52 can be brought into engagement with the pipe opening 34. Those of ordinary skill in the art will appreciate from this disclosure that the thread 52 can be of any configuration or omitted altogether without departing from the scope of the present invention.

The method of the present invention may, but does not necessarily, include positioning the shroud 90 over the plate 64 such that the plate 64 is inserted into the slot 112. FIG. 5 shows the shroud 90 over the plate 64 of the plug puller 40 such that the plate 64 is inserted into the slot 112.

Referring to FIGS. 4, 8, and 11, the method of the present invention can, but does not necessarily, include securing the first tool body axial end 86 to a power driver 124 so that the plug puller 40 can be rotated about the plug puller axial axis 42 to force the second plug puller axial end 48 into the pipe 22 with the thread 52 securely engaging the interior surface of the pipe 22.

Referring to FIGS. 3 and 5, the method of the present invention may include the step of locking the shroud 90 to the plug puller 40 prior to driving the plug puller 40 into the pipe 22. The method of the present invention further preferably includes the inserting of a locking pin 126 through the passageway 120 of the shroud 90 and the bore 66 of the plate 64 of the plug puller 40 to secure the plug puller 40 in the power drive adapter tool 80. It is preferred, but not necessary that the pin 126 has a lower section formed by a fastener 128 and an upper end formed by a brace 130 the brace 130 preferably has a handle 132 attached on an upper and thereof. It is also preferred that a locking nut 134 is configured to receive the fastener 128 therein. The locking nut 134 preferably also includes a brace 136 such that when the locking pin 126 is fully positioned through the shroud that the locking pin 126 is secured in position due to engagement of the fastener 128 with the locking nut 134 and with the braces 134, 136 each compressed and in abutting contact with one of the first and second major walls 94, 96. Those of ordinary skill in the art will appreciate from this disclosure that while one preferred locking mechanism has been disclosed, that any suitable locking mechanism to secure the plug puller 40 inside of the shroud 90 can be used without departing from the scope of the present invention.

The method of the present invention preferably includes driving the plug puller 40 into the pipe 22 using the power driver 124 such that the plug puller 40 does not have to be manually rotated to secure the plug puller 40 to the pipe 22. The term "does not have to be manually rotated" is defined as meaning that manual effort only needs to be applied so as to hold the power driver 124 steady during engagement of the plug puller 40 with the pipe 22. This means that it is not necessary to directly lever/or apply a manual torque directly onto the power driver adapter tool 80 so as to sequentially rotate the power driver adapter tool 80 in response to manual rotational force applied by a person's arms. In other words, any manual effort that is applied by a person is in providing a torque force that holds the power driver 124 in a generally constant position as opposed to providing a torque force that is meant to rotate the plug puller 40 by either rotating one's hands, or moving one's arms to prove push a lever. As such, it is preferred that the power used to drive the plug puller 40 into the pipe 22 does not require any manually applied torque to be applied to the plug puller 40. It is further preferred that the power used to drive the plug puller 40 is generated by the power driver 124 without any manual rotating of a tool or the plug puller and without manually levering of the plug puller about the pipe longitudinal axis. It is preferred that any manual force which needs to be applied by a user is applied only to holding the power driver in a generally stationary position such that all of the turning of the power driver adaptor tool is done by the power driver.

It is preferred that the step of driving the plug puller 40 into the pipe 22 include the power driver 124 being a commercial level power drill, impact gun, or impact driver (which can be powered by air or electric power or any other suitable source) or the like. Referring to FIGS. 11-17, the method of the present invention preferably includes providing a bracket system 140 for securing the pipe 22 and reducing rotation thereof during the driving of the plug puller 40 into the pipe 22.

Figure 12:
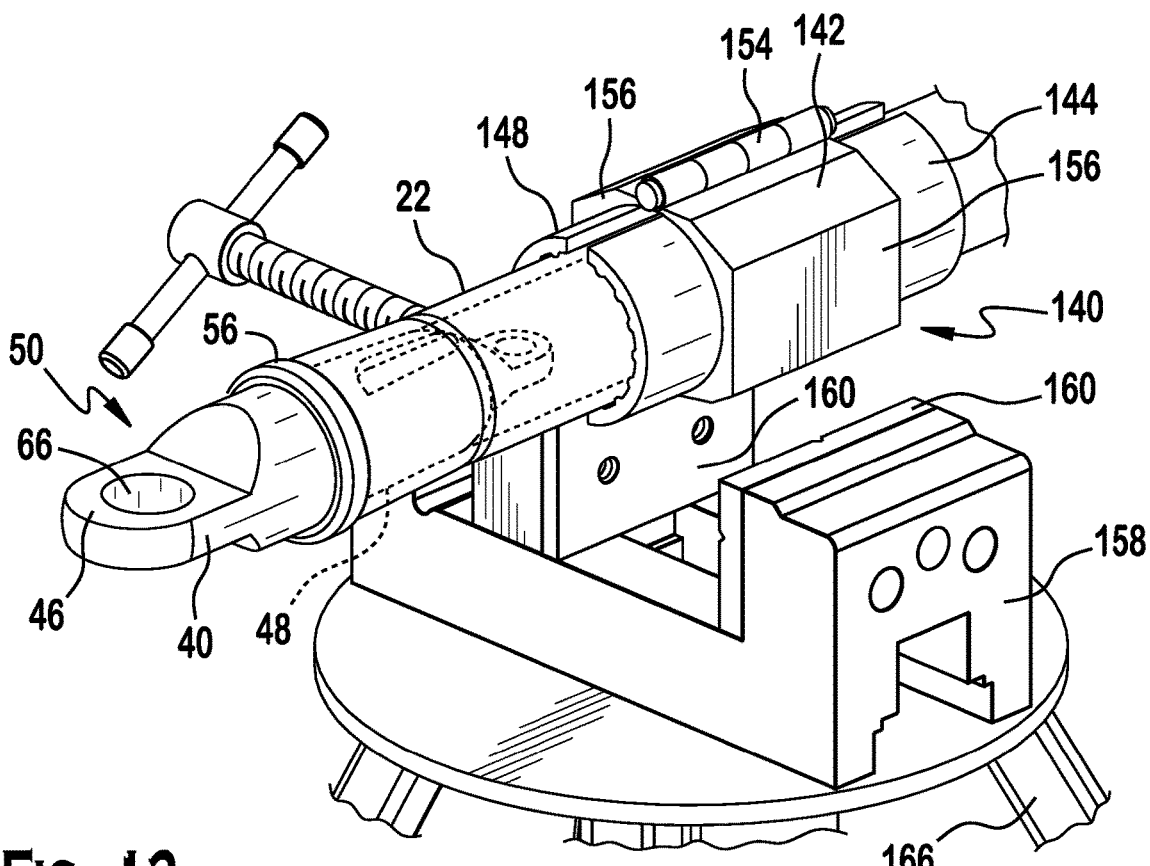
FIG. 12 is a perspective view of the pipe 22 engaged with the pipe immobilizer 142 which is being inserted into a vice 158 that is supported on a commercial tripod. The plug puller 40 is already fully inserted in the pipe once the pipe immobilizer 142 is secured within the vice. The power drive adapter tool 80 can be used to retract the plug puller from the pipe 22, if desired.
Figure 13:
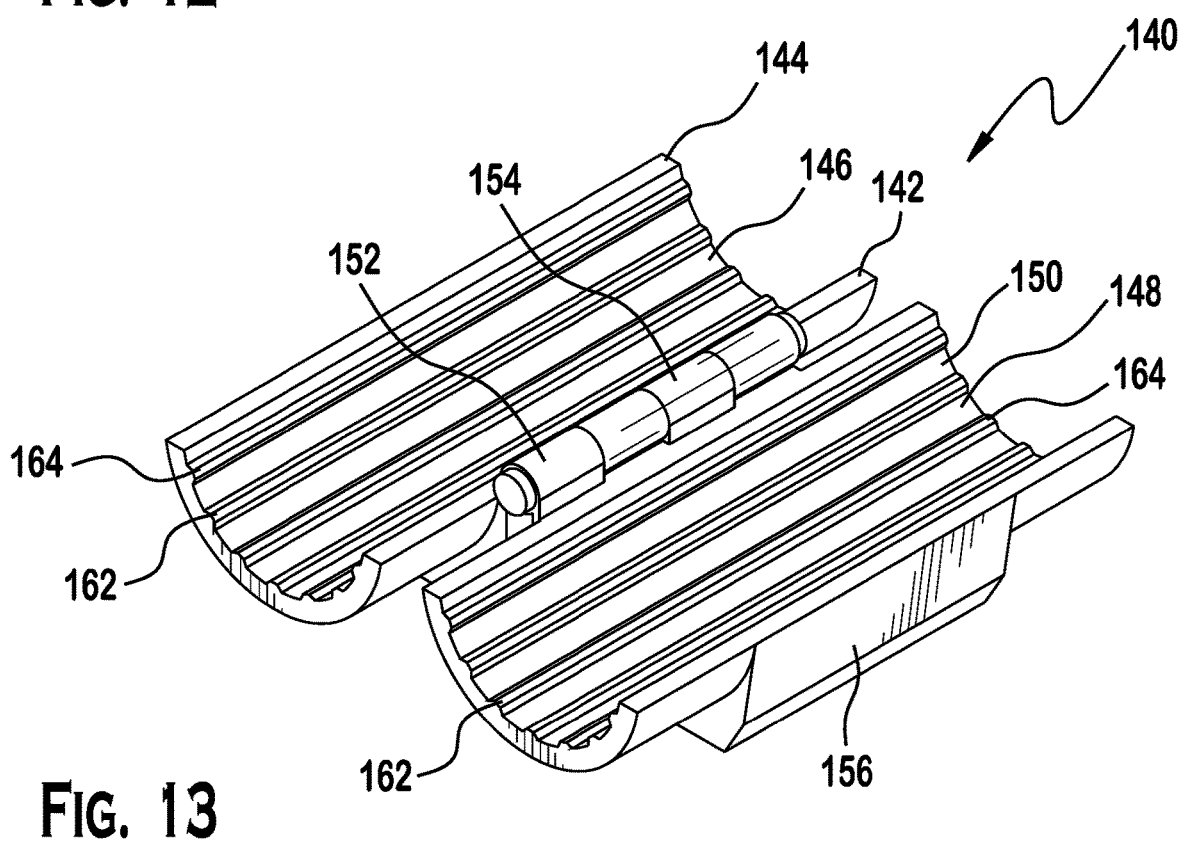
FIG. 13 is a perspective view of a preferred embodiment of the pipe immobilizer 142. The pipe immobilizer 142 includes a first plant section 144 and a second plant section 148. It is preferred that the first plant section 144 include a first pipe abutment surface 146 and that the second plant section 148 of the second pipe abutment surface 150. It is also preferred the first and second plant sections 144, 148 are hinged 154 together to allow the pipe immobilizer to be rotated into a gripping engagement with the pipe 22. It is preferred, but not necessary, that the exterior block sections 156 are located on each of the first and second plant sections 144, 148 to facilitate the proper positioning and stabilization of the pipe immobilizer in a vice 158.
Figure 14:
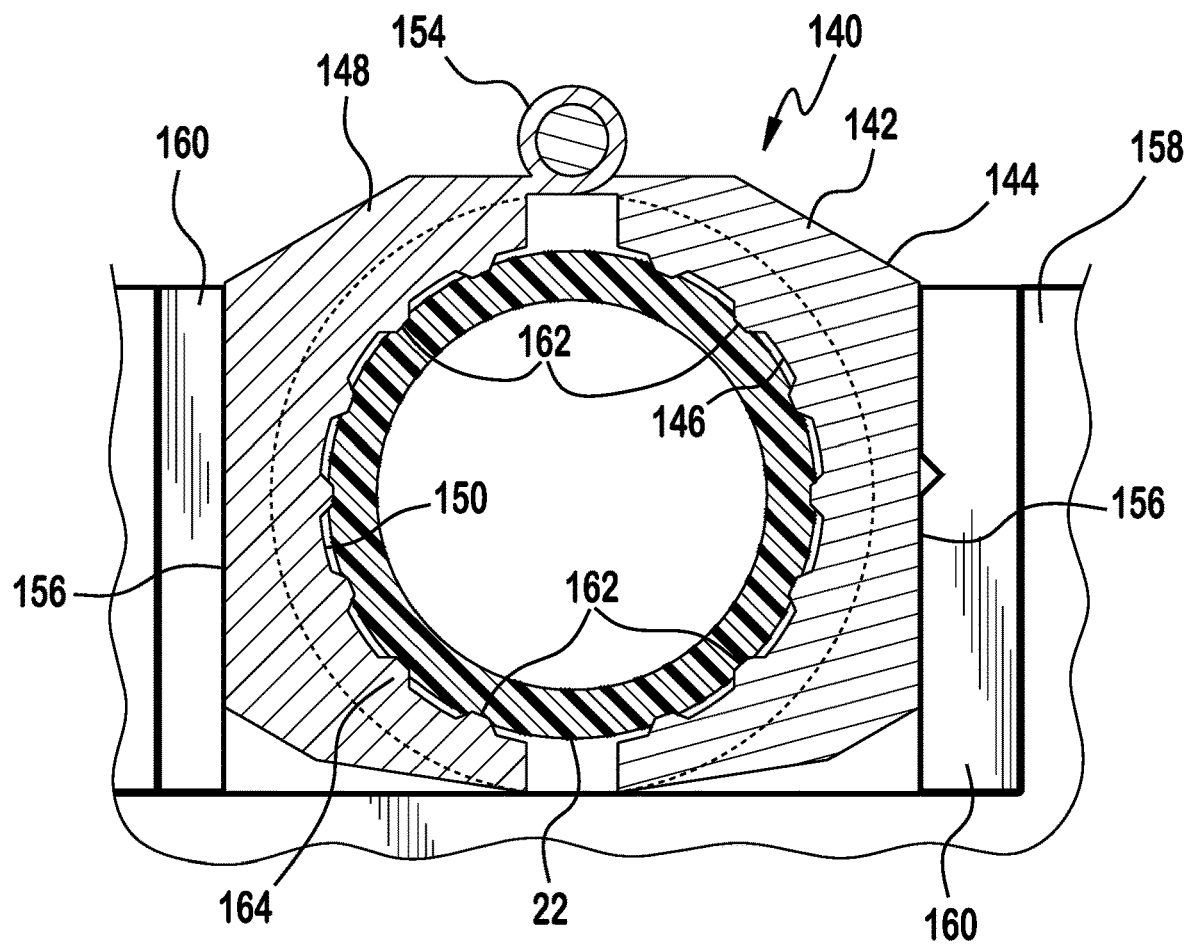
FIG. 14 is a cross-sectional view of the pipe immobilizer 142 and vice 158 of FIG. 11 as taken along the lines 14-14 of FIG. 11.
Figure 16:
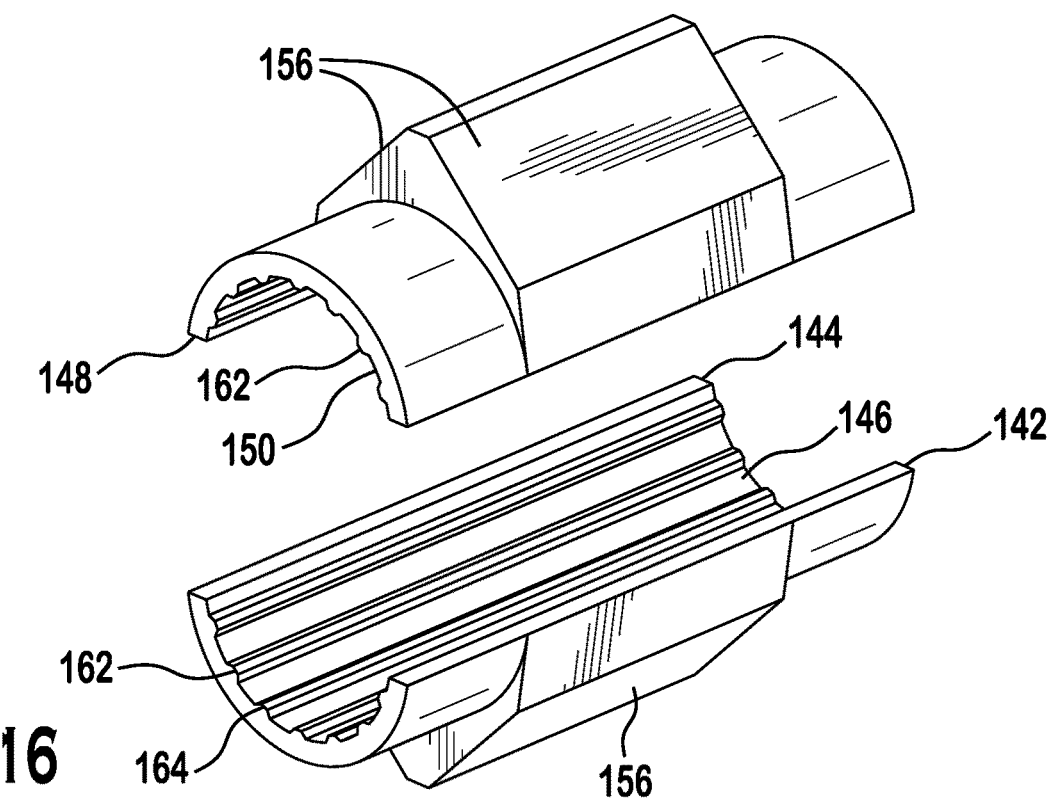
FIG. 16 is an exploded view of an alternate embodiment of a pipe immobilizer 142 of FIG. 15. When using the type of vice shown in FIG. 15, is not necessary that the first and second plant sections 144, 148 are pivotally connected to each other. Instead, the first plate can be laid at the bottom of the vice, the pipe 22 positioned thereover. The second plant section can be positioned on top of the pipe. Then the top portion of the pipe can be brought down into engagement with the upper exterior block section 156 too immobilize the pipe.
Figure 17:
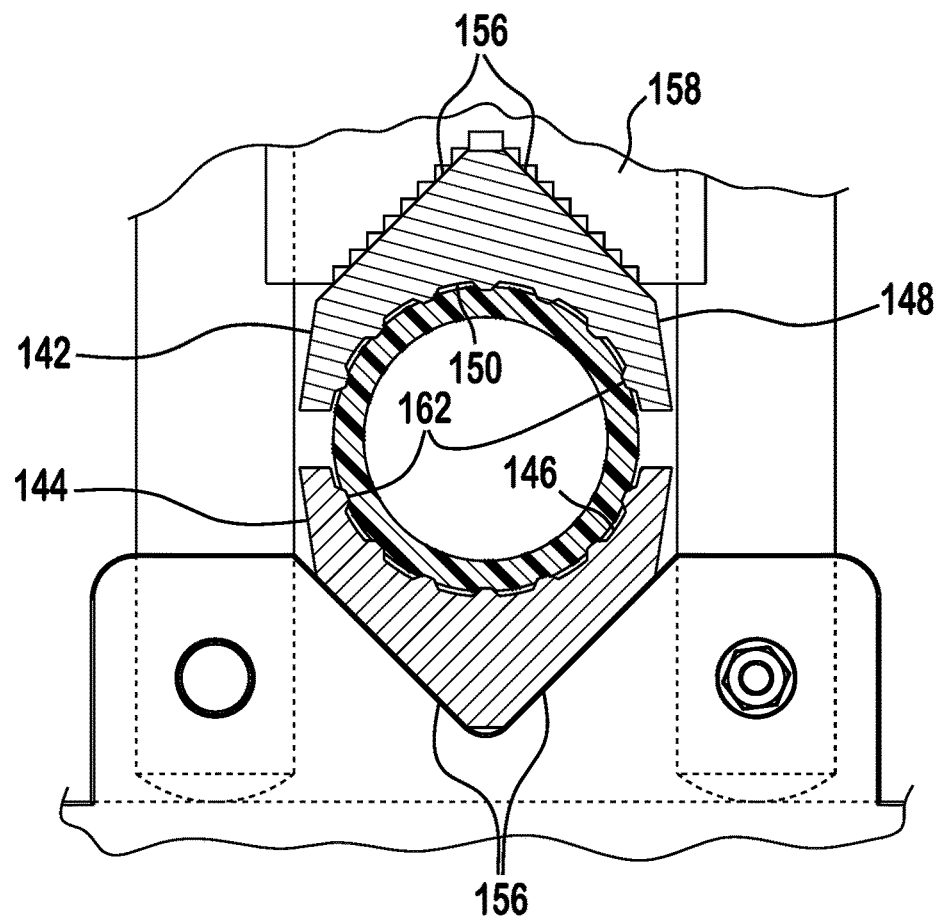
FIG. 17 is a cross-sectional view of the vice 158, pipe immobilizer 142, and pipe 22 of FIG. 15 as taken along the lines 17-17 of FIG. 15.
Figure 20:
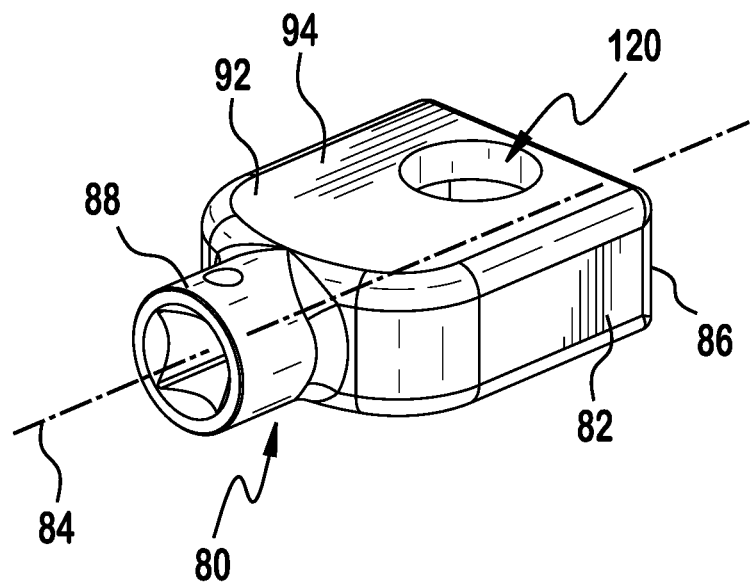
FIGS. 20 and 21 show alternative embodiments of the second tool body axial end 88 according to the present invention.
Figure 21:
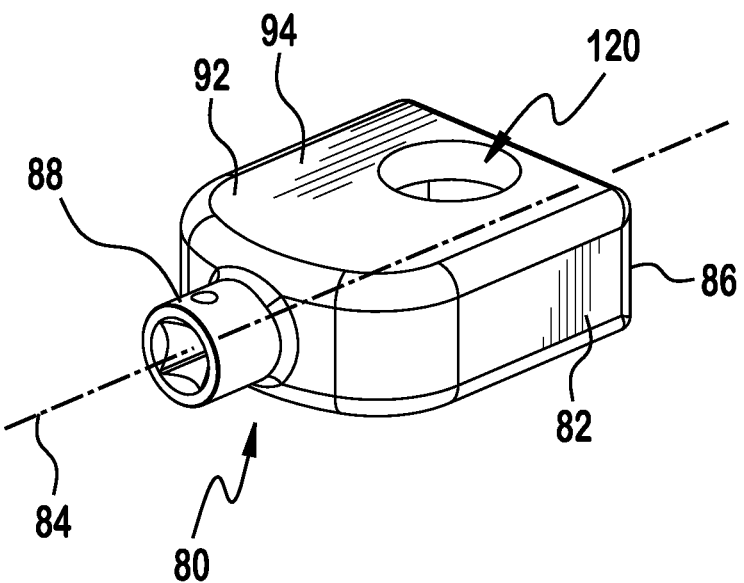
Figure 22:
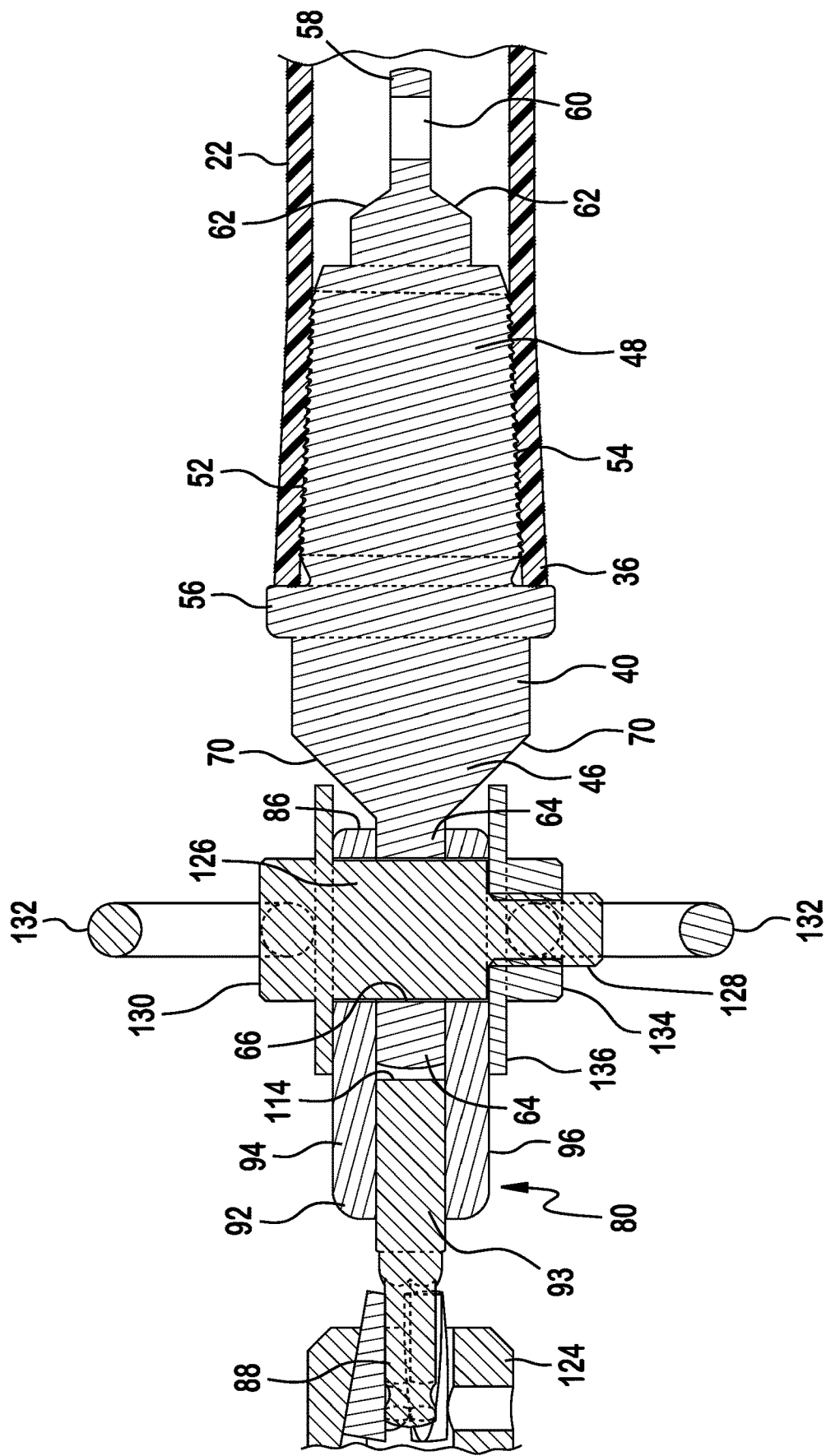
FIG. 22 illustrates yet another preferred embodiment of the power drive adapter tool 80 according to the present invention in which the tool body 82 is formed in part by three plate like pieces: first major wall 94, medial plate 93, and second major wall 96. It is preferred that the medial plate 93 is sandwiched between the first and second major walls 94, 96. The medial plate preferably, but not necessarily has a profile such that there is no gap between the inner wall of the slot 112 and the plate 64 of the plug puller body 44.
Figure 23:
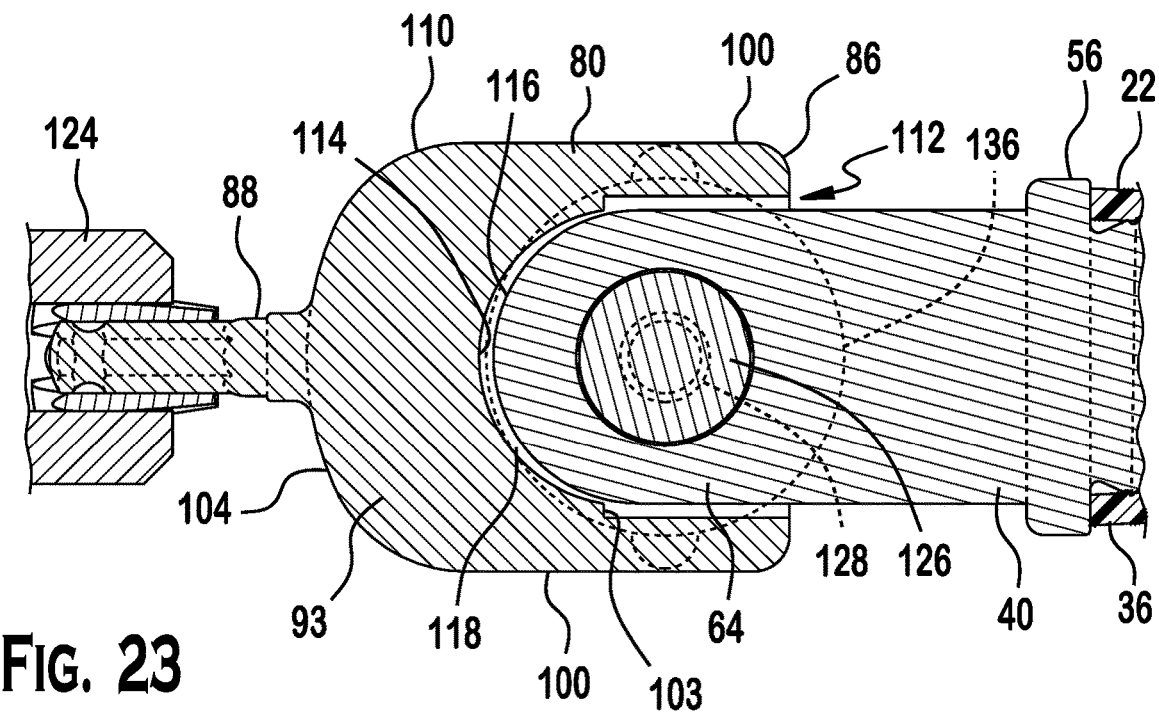
FIG. 23 is a cross sectional view of the power drive adaptor 80 according to another embodiment of the present invention which illustrates shoulders 103 which can be formed inside the slot 112. The slots 103 can allow a small linear gap between sides of the plate even though there is no gap 118 between the power drive adaptor tool 80 and the plug puller 40.
Figure 24:
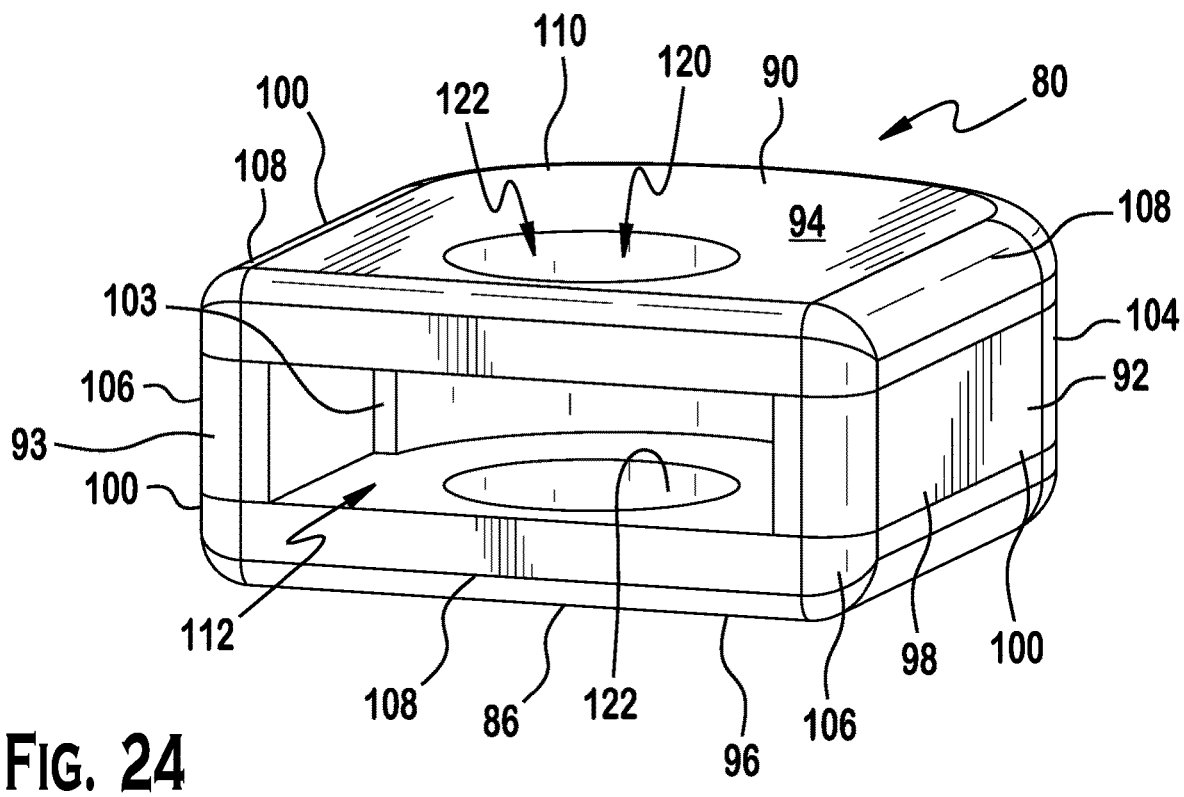
FIG. 24 is a perspective view of the power drive adaptor of FIG. 23 illustrating the shoulder 103 within the slot 112.

As best shown in FIGS. 12-14, the bracket system 140 preferably includes a pipe immobilizer 142. The pipe immobilizer 142 preferably includes a first clamp section 144 and having a first pipe abutment surface 146. The pipe immobilizer 142 preferably includes a second clamp section 148 having a second pipe abutment surface 150. The second clamp section 148 is preferably pivotally connected 152 to the first clamp section 144 such that the pipe immobilizer 142 is in a first pipe gripping position (as shown in FIGS. 12, 14, and 15) with the first clamp abutment surface 146 and the second clamp abutment surface 150 configured to be positioned against an outside of the pipe 22. It is preferred that the pivotal connection 152 is formed by a hinge 154. The pipe immobilizer 142 is preferably formed by a sturdy, strong, rigid material such as steel or the like. However, those of ordinary skill in the art will appreciate from this disclosure that any suitable material, such as alloy, stainless steel, or the like, can be used without departing from the scope of the present invention. It is preferred that the first clamp section 144 and the section of the second clamp section 148 each have an exterior block section 156 which is configured to facilitate positioning the pipe immobilizer 142 in a vice 158. FIGS. 12 and 14 show an exterior block section 156 configured for engagement with a vice 158 that applies lateral pressure with two vertical surfaces 160. In this application, it is preferred that the exterior block sections 156 form vertical sidewalls on opposing sides of the pipe immobilizer 142 to facilitate positionally fixing the pipe immobilizer 142 in the vice. FIGS. 15-17 illustrate more triangular-shaped exterior block sections 156 for placement in a vice 158 that brings to V-shaped draws together to both secure the pipe immobilizer vertically and laterally in position.

It is preferred, but not necessary, that the first pipe abutment surface 146 and the second pipe abutment surface 150 each have a buildup area 162 thereon. The buildup area 162 is preferably configured to facilitate creating a friction-fit between the pipe immobilizer 142 and the pipe 22 when the pipe immobilizer 142 is in the first pipe gripping position as shown in FIGS. 12, 15, and 17. Although specific configurations of the exterior block section 156 are shown in this disclosure for use with two different types of devices 158, those of ordinary skill in the art will appreciate from this disclosure that the pipe immobilizer 142 can be used with any type of vice or other securing device without departing from the scope of the present invention. It is preferred, but not necessary that the buildup include at least one rebar section 164 that is each position such as to be generally parallel to the pipe when the pipe immobilizer is in the first pipe gripping position.

Referring to FIGS. 11, 12, and 15, it is preferred that the vice 158 can be supported on a commercial tripod 166. The tripod 166 may have detachable bolts connecting it to the ground 168 or be otherwise security position. It is preferable that the tripod 166 and the vice 158 hold the first axial end 36 of the pipe 22 generally parallel to the ground 168 so that a user can grasp the powered driver 124 at hand points 170, 172. This allows a user to only extend manual energy maintaining the position of the power driver 124 relative to the first axial end 36 such that all of the rotation of the pipe puller 40 which drives the pipe puller 40 into the pipe 22 is driven by the power driver 124. This eliminates the need for a user to use any manual energy directly on rotating or levering the pipe puller 42 secure the pipe puller 40 to the pipe 22.

A preferred embodiment of the present invention operates as follows. The user places it pipe immobilizer 142 (as shown in FIG. 13) around a pipe 22 proximate to the first axial end 36 of the pipe as shown in FIG. 12. Referring to FIG. 11, the pipe immobilizer 142 may be put inside of a vice 158 supported by a tripod 166. This preferably results with the pipe opening 34 being easily accessible.

Referring to FIG. 3, a power driver adapter tool 80 is preferably slid over an end of a plug puller 40 such that a plate 64 which forms an end of the plug puller 40 is positioned inside of a slot 112 of a shroud 90 of the power driver adapter tool 80. Once the plate 64 is fully inserted in the slot 112, a locking pin 126 is preferably inserted through passageway 120 in the shroud and through a bore 66 in the plate 64 so as to lock the power driver adapter tool 80 to the plug puller 40. The locking pin 126 is held in position by attaching locking nut 136 to the fastener 128 which extends from the locking pin. The components are tightened until collars on each side of the shroud 90 are pressed flush thereagainst the exterior of the shroud 90.

Then the first tool body axial end 86 is secured to the power driver 124. The user then positions the power driver 124 so that a distal end of the plug puller abuts the pipe opening 34. Then the user manually holds the power driver 124 generally steady in position so as to prevent rotation and movement of the power driver 124 while the power driver 124 rotates the plug puller so as to drive the plug puller into the pipe opening 34.

Then, the locking pin 126 is removed from the shroud 90 and the power drive adapter tool 80 is detached from the plug puller as shown in FIG. 6. Then, a carabiner (as shown in FIG. 6) can be used to attach a cable which will be used to draw the plug puller 40 and the pipe 22 through the underground passageway 30. Once the pipe 22 fully traverses the underground passageway 30, the carabiner is removed and pipe 22 is secured via the pipe immobilizer and a vice 158. Then the power drive adapter tool re-connected to the plug puller 40. At this point, the power driver can be used to remove the plug puller 40 from the pipe 22. Accordingly, it is preferred, but not necessary, that the plug puller 40 can be attached and detached from the pipe 22 without using any manual force from the user to rotate the plug puller or to lever the plug puller through rotation to engage the plug puller with the pipe 22. In contrast, it is preferred that any physical force is used simply to stabilize the position of the power driver 124.

While the preferred embodiment is disclosed above, those of ordinary skill in the art will appreciate from this disclosure that the structure of the device can be varied without departing from the scope of the present invention. For example, one of ordinary skill in the art will appreciate from this disclosure that system elements, as well as materials, shapes and dimensions of device elements, as well as methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed, described in the specification, and/or shown in the figures. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention.

What is claimed is:

1. A method for attaching a plug puller to a pipe, comprising the steps of:
providing the pipe which defines a pipe opening at a first pipe axial end thereof;
providing the plug puller having a plug puller longitudinal axis, comprising:
a plug puller body having a first plug puller axial end and a second plug puller axial end;
the second plug puller axial end having a cylindrical shape with a thread located on an outer surface thereof;
the first plug puller axial end being formed by a plate having a bore therethrough, the bore being oriented perpendicular to the plug puller longitudinal axis;
providing a power drive adapter tool, comprising:
a tool body having a tool body longitudinal axis, a first tool body axial end, and a second tool body axial end;
the second tool body axial end being formed by a shroud, the shroud defining a slot with an opening at the second tool body axial end configured to receive the plate which forms the first plug puller axial end therein, the shroud having a passageway therethrough, the power drive adaptor tool being configured such that when the plate of the plug puller is inserted in the slot the shroud the bore is aligned with the passageway;
positioning the second plug puller axial end at the pipe opening such that the thread can be brought into engagement with the pipe opening;
positioning the shroud over the plate such that the plate is inserted into the slot;
securing the first tool body axial end to a power driver so that the plug puller can be rotated and about the plug puller axial axis to force the second plug puller axial end into the pipe with the thread securely engaging the pipe;
locking the shroud to the plug puller prior to driving the plug puller into the pipe;
inserting a locking pin through the passageway of the shroud and the bore of the plate of the plug puller to secure the plug puller in the power drive adaptor tool; and
driving the plug puller into the pipe using power driver such that the plug puller does not have to be manually rotated to secure the plug puller to the pipe, wherein the power driver is a powered drill.

2. The method of claim 1, further comprising providing a bracket system for securing the pipe and reducing rotation thereof during the driving of the plug puller into the pipe.

3. The method of claim 2, wherein the step of providing the bracket system further comprises:
a pipe immobilizer, comprising:
a first clamp section having a first pipe abutment surface; and
a second clamp section having a second pipe abutment surface, the second clamp section being pivotally connected to the first clamp such that when the first and second clamp are rotated together such that the pipe immobilizer is in a first pipe gripping position with the first clamp abutment surface and the second clamp abutment configured to be positioned against an outside of the pipe.

4. The method of claim 3, wherein the step of providing the bracket system further comprises the first pipe abutment surface and the second pipe abutment surface each having a buildup area thereon configured to facilitate creating a friction fit between the pipe immobilizer and the pipe when the pipe immobilizer is in the first pipe gripping position.

5. The method of claim 4, wherein the step of providing the bracket system further comprises the buildup being at least one rebar section each positioned such that it is generally parallel to the pipe when the pipe immobilizer is in the first pipe gripping position.

6. The method of claim 5, wherein a power used to drive the plug puller into the pipe does not require any manually applied torque to be applied to the plug puller, any manual force which needs to be applied by a user is applied only to holding the power driver in a generally stationary position such that all of the turning of the power driver adaptor tool is done by the power driver.

7. The method of claim 5, wherein a power used to drive the plug puller is generated by the power driver without any manual rotating and without any manual levering of the plug puller about the pipe longitudinal axis.

8. The method of claim 1, wherein a power used to drive the plug puller into the pipe does not require any manually applied torque to be applied to the plug puller, any manual force which needs to be applied by a user is applied only to holding the power driver in a generally stationary position such that all of the turning of the power driver adaptor tool is done by the power driver.

9. The method of claim 1, wherein a power used to drive the plug puller is generated by the power driver without any manual rotating and without any manual levering of the plug puller about the pipe longitudinal axis.

10. A method for attaching a plug puller to a pipe, comprising the steps of:
providing the pipe which defines a pipe opening at a first pipe axial end thereof;
providing the plug puller having a plug puller longitudinal axis, comprising:
a plug puller body having a first plug puller axial end and a second plug puller axial end;
the second plug puller axial end having a cylindrical shape with a thread located on an outer surface thereof;
the first plug puller axial end being formed by a plate having a bore therethrough, the bore being oriented perpendicular to the plug puller longitudinal axis;
providing a power drive adapter tool, comprising:
a tool body having a tool body longitudinal axis, a first tool body axial end, and a second tool body axial end;
the second tool body axial end being formed by a shroud, the shroud defining a slot with an opening at the second tool body axial end configured to receive the plate which forms the first plug puller axial end therein, the shroud having a passageway therethrough, the power drive adaptor tool being configured such that when the plate of the plug puller is inserted in the slot the shroud the bore is aligned with the passageway;
positioning the second plug puller axial end at the pipe opening such that the thread can be brought into engagement with the pipe opening;
positioning the shroud over the plate such that the plate is inserted into the slot
securing the first tool body axial end to a power driver so that the plug puller can be rotated and about the plug puller axial axis to force the second plug puller axial end into the pipe with the thread securely engaging the pipe;
inserting a locking pin through the passageway of the shroud and the bore of the plate of the plug puller to secure the plug puller in the power drive adaptor tool; and
driving the plug puller into the pipe using power driver such that the plug puller does not have to be manually rotated to secure the plug puller to the pipe, wherein the power driver is a powered drill.

11. The method of claim 10, further comprising providing a bracket system for securing the pipe and reducing rotation thereof during the driving of the plug puller into the pipe.

12. The method of claim 11, wherein the step of providing the bracket system further comprises:
a pipe immobilizer, comprising:
a first clamp section having a first pipe abutment surface; and
a second clamp section having a second pipe abutment surface, the second clamp section being pivotally connected to the first clamp such that when the first and second clamp are rotated together such that the pipe immobilizer is in a first pipe gripping position with the first clamp abutment surface and the second clamp abutment configured to be positioned against an outside of the pipe.

13. The method of claim 12, wherein the step of providing the bracket system further comprises the first pipe abutment surface and the second pipe abutment surface each having a buildup area thereon configured to facilitate creating a friction fit between the pipe immobilizer and the pipe when the pipe immobilizer is in the first pipe gripping position.

14. The method of claim 13, wherein the step of providing the bracket system further comprises the buildup being at least one rebar section each positioned such that it is generally parallel to the pipe when the pipe immobilizer is in the first pipe gripping position.

15. The method of claim 10, wherein a power used to drive the plug puller into the pipe does not require any manually applied torque to be applied to the plug puller, any manual force which needs to be applied by a user is applied only to holding the power driver in a generally stationary position such that all of the turning of the power driver adaptor tool is done by the power driver.

16. The method of claim 10, wherein a power used to drive the plug puller is generated by the power driver without any manual rotating and without any manual levering of the plug puller about the pipe longitudinal axis.

* * * * *